US 11,742,639 B2

(12) United States Patent
Hanna et al.

(10) Patent No.: US 11,742,639 B2
(45) Date of Patent: Aug. 29, 2023

(54) SWITCHGEAR SYSTEM HAVING TRUCK DRIVEN SHUTTER MECHANISM

(71) Applicant: JST POWER EQUIPMENT, INC., Lake Mary, FL (US)

(72) Inventors: Robert L. Hanna, Enterprise, FL (US); Patrick R. Fischer-Carne, New Smyrna Beach, FL (US); Daniel C. Davis, Lady Lake, FL (US); Guillermo Alvelo, Jr., Debary, FL (US); Rahul M. Pawar, Sanford, FL (US); Haoning Liang, Beijing (CN)

(73) Assignee: JST POWER EQUIPMENT, INC., Lake Mary, FL (US)

( * ) Notice: Subject to any disclaimer, the term of this patent is extended or adjusted under 35 U.S.C. 154(b) by 8 days.

(21) Appl. No.: 17/422,768

(22) PCT Filed: Apr. 26, 2021

(86) PCT No.: PCT/CN2021/089903
§ 371 (c)(1),
(2) Date: Jan. 26, 2022

(87) PCT Pub. No.: WO2022/178964
PCT Pub. Date: Sep. 1, 2022

(65) Prior Publication Data
US 2022/0271519 A1    Aug. 25, 2022

Related U.S. Application Data

(60) Provisional application No. 63/153,419, filed on Feb. 25, 2021.

(51) Int. Cl.
*H02B 11/167* (2006.01)
*H02B 11/127* (2006.01)
(Continued)

(52) U.S. Cl.
CPC ......... *H02B 11/24* (2013.01); *H02B 11/133* (2013.01); *H02B 11/167* (2013.01)

(58) Field of Classification Search
CPC ... H02B 11/127; H02B 11/133; H02B 11/167; H02B 11/24; H02B 11/26
See application file for complete search history.

(56) References Cited

U.S. PATENT DOCUMENTS 2,554,510 A    5/1951 Spicer
3,052,820 A    9/1962 Kreekon et al.
(Continued)

FOREIGN PATENT DOCUMENTS

CN    2919499    7/2007
CN    201887367    6/2011
(Continued)

*Primary Examiner* — Robert J Hoffberg
(74) *Attorney, Agent, or Firm* — Allen, Dyer, Doppelt + Gilchrist, P.A.

(57) ABSTRACT

A switchgear system may include a switchgear frame and a truck carrying a circuit breaker and supported for linear movement on the switchgear frame. A drive mechanism may rack in the truck and the circuit breaker is in electrical connection with primary circuit contacts, and may rack out the truck and the circuit breaker is electrically disconnected from the primary circuit contacts. As the drive mechanism racks in the circuit breaker, a shutter linkage moves a shutter opened, and as the drive mechanism racks out the circuit breaker, the shutter linkage moves the shutter closed over the primary circuit contacts.

28 Claims, 29 Drawing Sheets

(51) Int. Cl.
*H02B 11/24* (2006.01)
*H02B 11/133* (2006.01)

(56) References Cited

U.S. PATENT DOCUMENTS

| | | | |
|---|---|---|---|
| 3,914,659 A | 10/1975 | May et al. | |
| 8,212,164 B2 | 7/2012 | Waynick, Sr. | |
| 8,283,585 B2 * | 10/2012 | Capelli | H02B 11/28 200/50.23 |
| 8,366,460 B2 | 2/2013 | Jurek et al. | |
| 8,835,782 B2 | 9/2014 | Fischer-Carne et al. | |
| 8,891,229 B2 | 11/2014 | Fischer-Carne et al. | |
| 9,123,488 B2 * | 9/2015 | Seo | H01H 33/666 |
| 9,515,462 B2 * | 12/2016 | Capelli | H02B 11/02 |
| 9,516,784 B2 | 12/2016 | Pawar et al. | |
| 9,627,866 B2 | 4/2017 | Pawar et al. | |
| 9,871,358 B2 | 1/2018 | Pawar et al. | |
| 9,899,810 B2 | 2/2018 | Pawar | |
| 10,777,979 B2 * | 9/2020 | Boyce | H02B 11/127 |
| 2014/0036418 A1 | 2/2014 | Eichler et al. | |
| 2022/0270840 A1 * | 8/2022 | Hanna | H01H 83/04 |
| 2022/0271516 A1 * | 8/2022 | Hanna | H02B 11/127 |
| 2022/0271517 A1 * | 8/2022 | Hanna | H02B 11/167 |
| 2022/0271518 A1 * | 8/2022 | Hanna | H02B 1/38 |

FOREIGN PATENT DOCUMENTS

| | | | |
|---|---|---|---|
| CN | 202276065 | 6/2012 | |
| CN | 102684099 A | 9/2012 | |
| CN | 103081265 A | 5/2013 | |
| CN | 205791021 | 12/2016 | |
| CN | 207251059 | 4/2018 | |
| CN | 207612001 | 7/2018 | |
| CN | 207782179 | 8/2018 | |
| CN | 208299313 | 12/2018 | |
| CN | 211062642 | 7/2020 | |
| CN | 213212782 | 5/2021 | |
| EP | 2405545 A1 * | 1/2012 | H02B 11/24 |
| EP | 2405545 A1 | 1/2012 | |
| GB | 243125 A | 11/1925 | |
| GB | 428225 A * | 11/1935 | H02B 11/24 |
| JP | 2012-130120 A | 7/2012 | |
| TW | 200707871 | 2/2007 | |
| TW | 200845076 | 11/2008 | |
| WO | 2004/107375 | 12/2004 | |
| WO | WO-2020082239 A1 * | 4/2020 | |

* cited by examiner

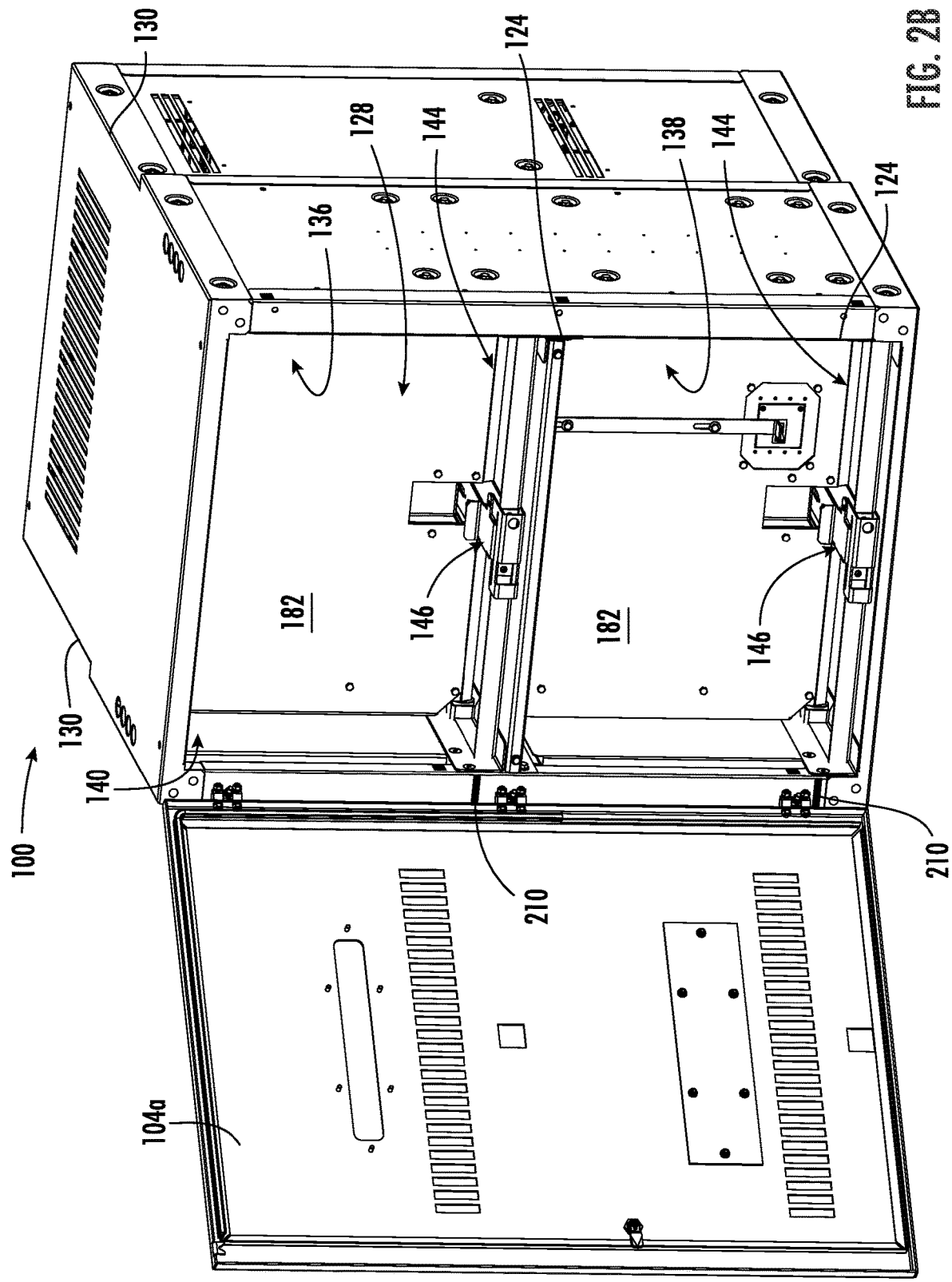

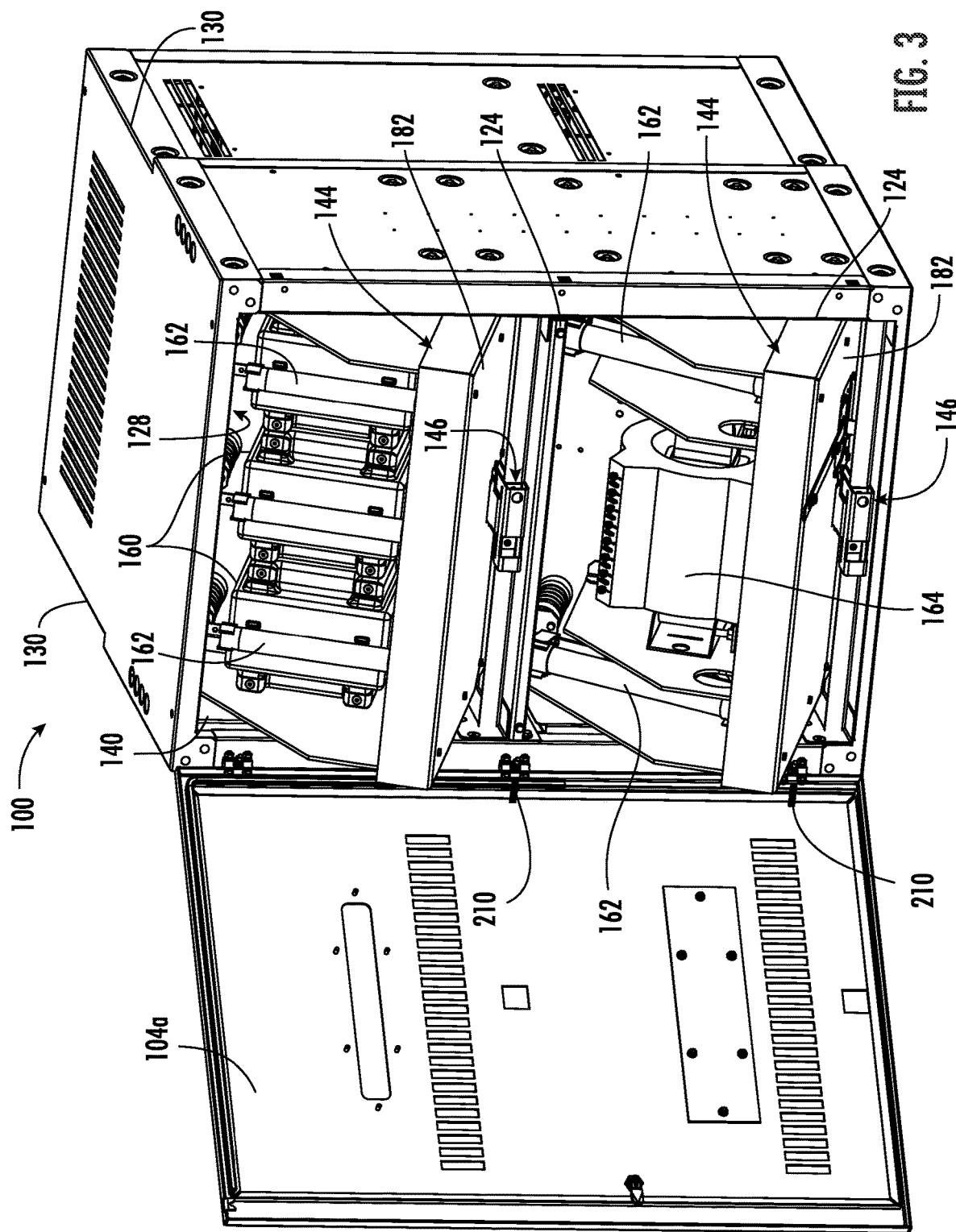

CONNECT POSITION

DISCONNECT POSITION

ROTATED POSITION

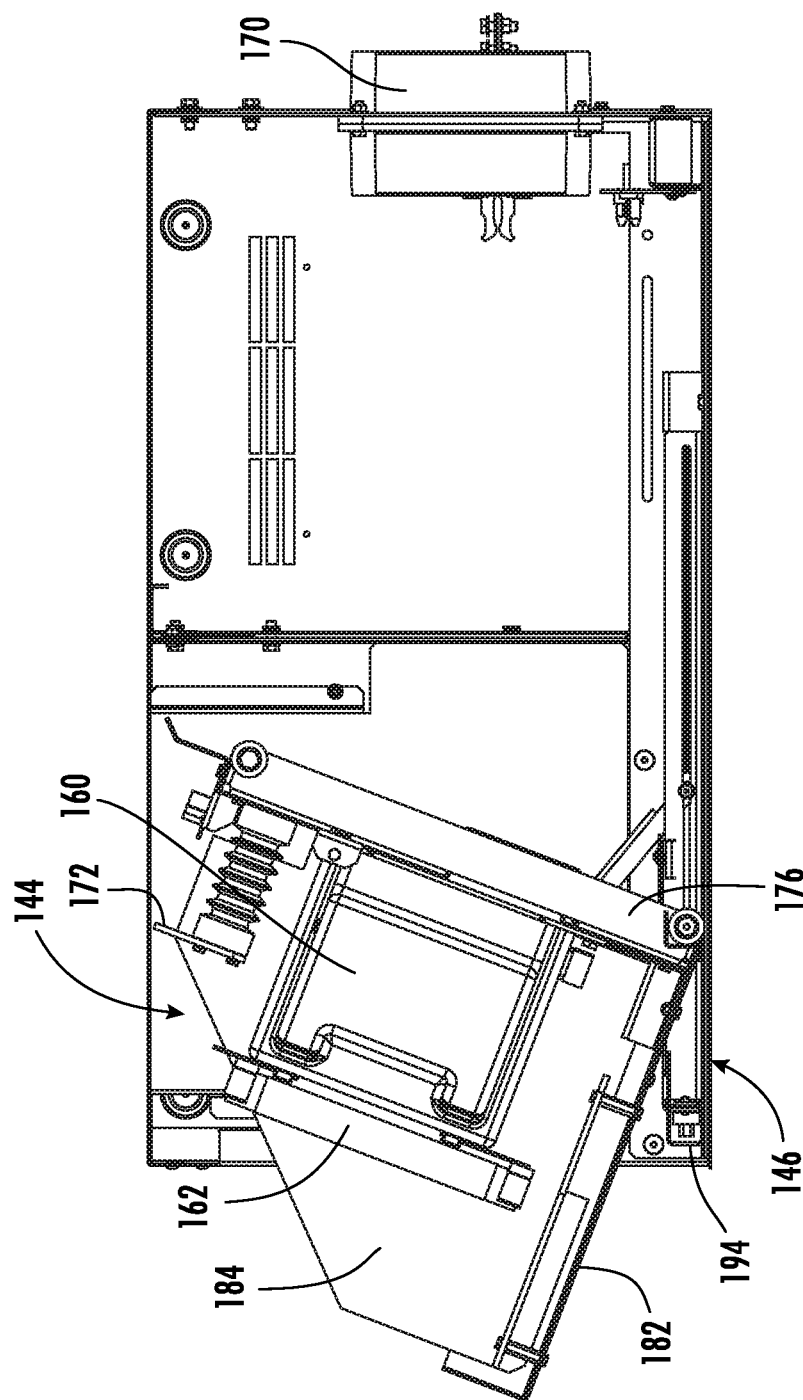

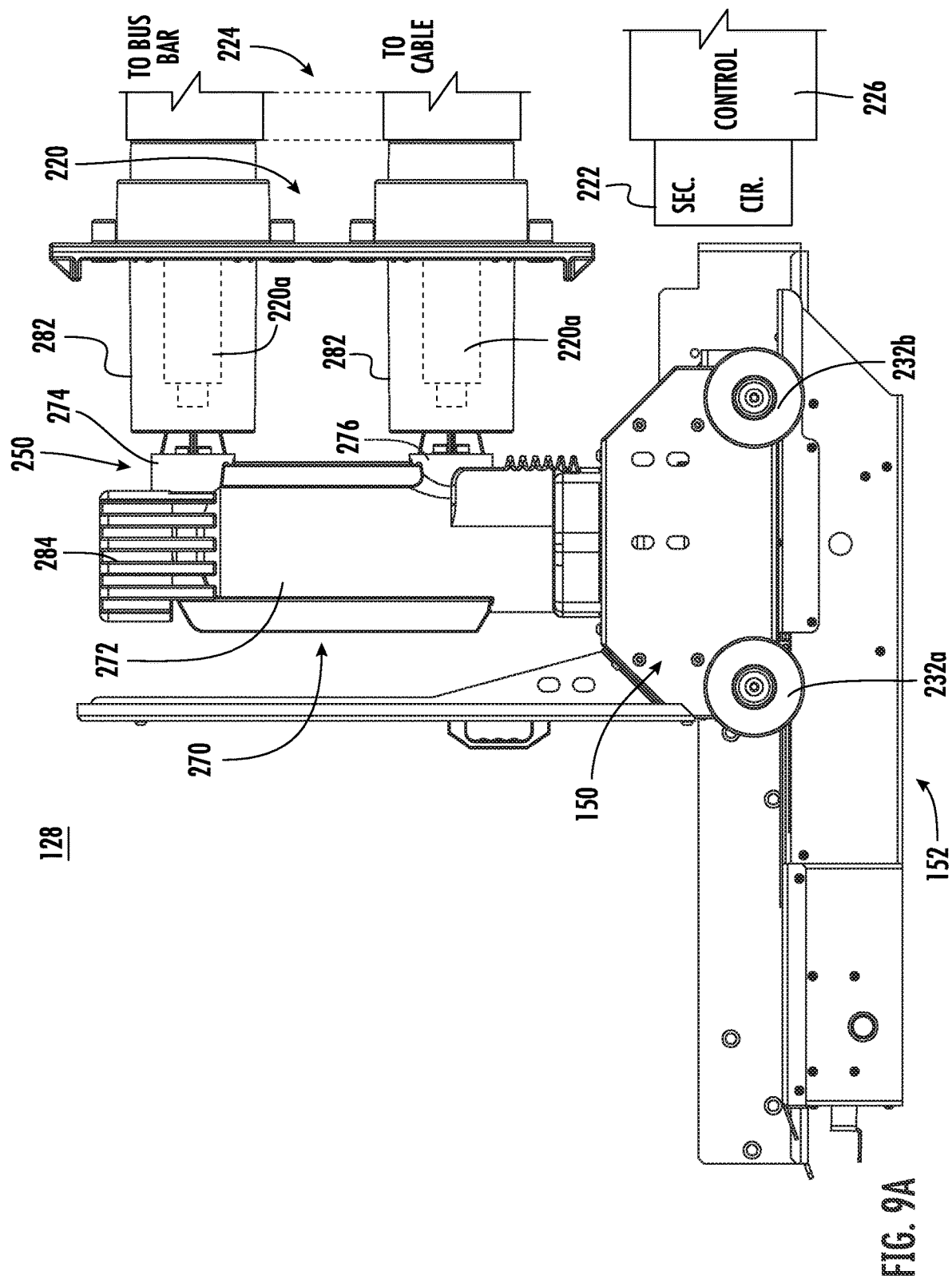

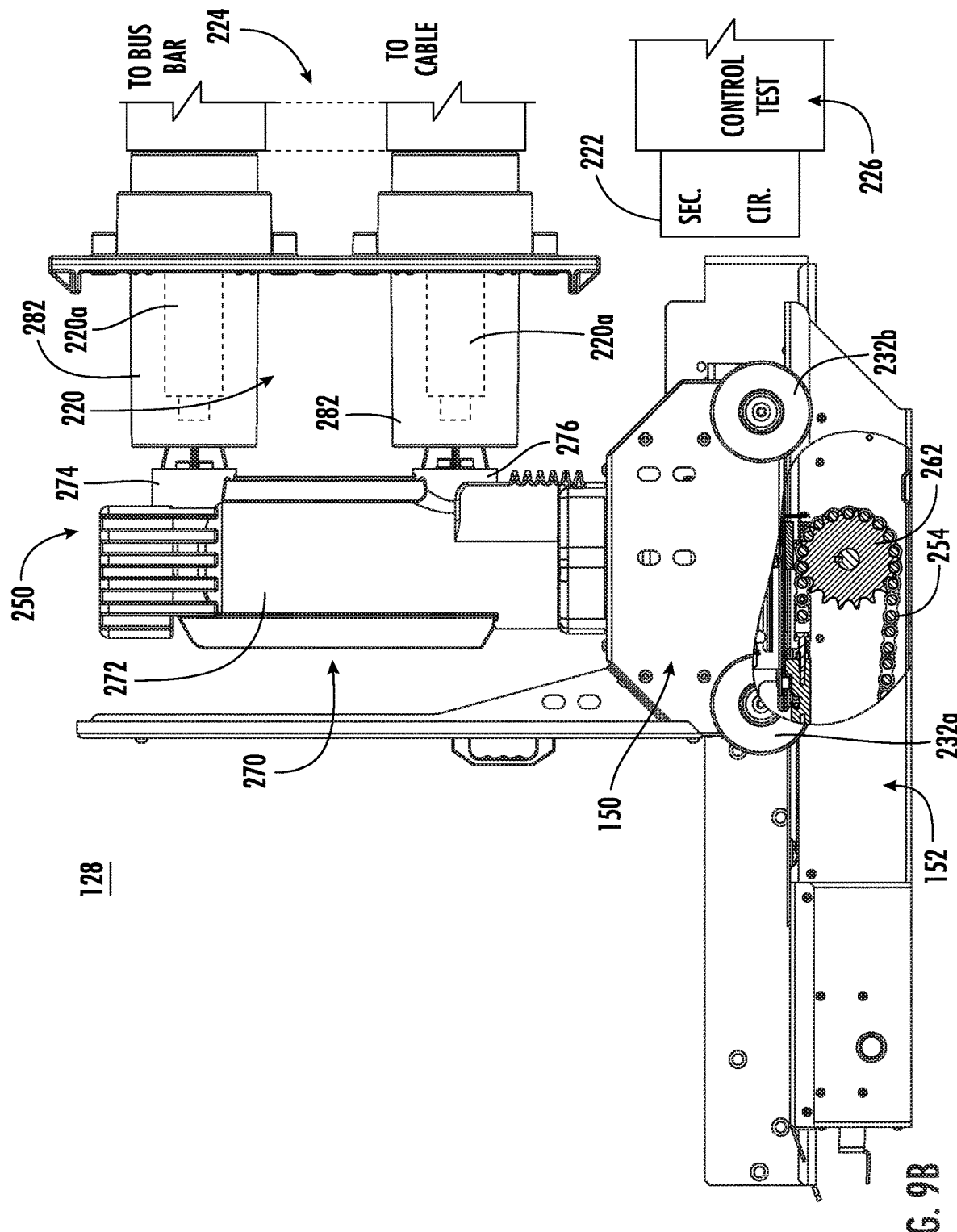

SWITCHGEAR SYSTEM HAVING TRUCK DRIVEN SHUTTER MECHANISM

PRIORITY APPLICATION(S)

This application is based upon provisional application Ser. No. 63/153,419, filed Feb. 25, 2021, the disclosure which is hereby incorporated by reference in its entirety.

FIELD OF THE INVENTION

The present invention relates to electrical systems, and more particularly, to electrical switchgear systems.

BACKGROUND OF THE INVENTION

Metal-clad or metal-enclosed medium voltage switchgear systems operate as three-phase systems that connect to the three-phase power distribution grid and provide various control functions and provide protection against short circuit events and similar overcurrent or other fault conditions. These switchgear systems include transformers to reduce the primary circuit voltage, which can be greater than 1,000 volts, to a much lower voltage that may energize control circuits or monitor or meter the primary voltage. These switchgear systems and associated load circuits may be protected from damage by a fuse when the transformers fail. The transformers and fuses may be mounted together as an assembly on a truck that is movable as a platform within the switchgear frame and associated interior compartment.

The truck may include wheels that ride on rails on either side of the switchgear frame. The transformer and any associated fuses occasionally need to be checked or serviced, which requires access to these components. The transformer and fuses are mounted on the truck, which allows for the connection and disconnection of electrical circuits from the transformer and fuses by racking out the truck. After disconnection, existing techniques to access the transformers and fuses for maintenance and service require the transformer and fuse as an assembly to be completely removed from the switchgear system using extension rails that extend outward from the switchgear frame or a lift-truck. The lift-truck may be cumbersome and the extension rails may deflect. Thus, improvements are desirable.

Switchgear systems also use circuit breakers, which open and close individual circuits and are mounted on a truck. These circuit breakers may be connected and disconnected not only from primary circuits, but also may be connected and disconnected from the secondary control power circuit. The manner in which the circuit breaker moves between these positions, such as a connected, a test, and a disconnected position, is often important to its ability to operate as a circuit breaker and be maintained as part of the service of the switchgear system.

Short circuit events and similar overcurrent or other fault conditions may generate very large currents, which places physical stresses on the circuit breaker and the racking system that includes the truck that racks in and racks out the circuit breaker from the electrically connected, test, and disconnected positions. Further improvements would be advantageous to support movement of the circuit breakers on the truck and created more stable operation, especially when there are short circuit events or similar overcurrent or other fault conditions.

Many switchgear systems include shutters that fail closed and cover primary circuit contacts, but sometimes cause sparks and burning. In rare cases when they fail in a closed position, there may be an explosion. Failing open has not always been an option, even though the circuit breakers are racked in 97-99% of the time. Also, when requiring maintenance on a circuit breaker, the shutters should be closed to protect an operator or maintenance worker from contacting the primary circuit contacts. Further improvements in shutter design for switchgear systems would be advantageous.

Metal clad switchgear systems usually include at least one or more interior compartments that contain transformers, circuit breakers, and other electrical components, and often include an adjacent main bus compartment, including a cable compartment. High heat is often generated in these interior compartments, especially during a fault or short circuit event that creates arcing conditions. The switchgear system includes these interior compartments that are sometimes difficult to vent.

In some cases, the buses are difficult to cool because the buses are sometimes aligned along a common X-axis in a vertically stacked arrangement, causing hot air from lower buses to heat up the upper buses. Some switchgear systems include arc-resistant interior compartments, but it is important to vent these compartments to minimize temperature rises. Fans and other powered cooling devices may be used, but convective cooling in some cases is preferred. Further improvements in ventilation systems are desired.

The switchgear systems that include a truck carrying a circuit breaker may include contact arms that are used to connect the circuit breaker to contacts of the circuit breaker truck and engage stationary contacts connected to a primary circuit, which may include one or more bus connections. Some contact arms include annular rings disposed in spaced relation for convective heat rejection. These annular rings depending on their configuration may cause high electrostatic field stresses and shorter flash over path links to grounded objects in the switchgear system. These high amperage circuit breakers and switchgear contact fingers are a source of heat and excess temperature rises may cause failures. Improvements in configuration for contact arm assemblies that would impart better heat conduction would be advantageous.

SUMMARY OF THE INVENTION

This summary is provided to introduce a selection of concepts that are further described below in the Detailed Description. This summary is not intended to identify key or essential features of the claimed subject matter, nor is it intended to be used as an aid in limiting the scope of the claimed subject matter.

In general, a switchgear system may comprise a switchgear frame having an interior compartment and primary circuit contacts. A truck may carry a circuit breaker and supported for linear movement on the switchgear frame. A drive mechanism may be mounted on the switchgear frame and connected to the truck and configured to rack in the truck where the circuit breaker is in electrical connection with the primary circuit contacts, and rack out the truck where the circuit breaker is electrically disconnected from the primary circuit contacts. A shutter mechanism may be connected to the drive mechanism and may comprise a shutter and a shutter linkage connected to the drive mechanism and shutter. As the drive mechanism racks in the circuit breaker, the shutter linkage moves the shutter opened, and as the drive mechanism racks out the circuit breaker the shutter linkage moves the shutter closed over the primary circuit contacts.

The primary circuit contacts may comprise upper and lower primary circuit contacts and may further comprise respective upper and lower shutters. The primary circuit contacts may comprise a contact body and the shutter is pivotally mounted on the contact body. The linkage may comprise a cam connected to the drive mechanism, and a cam follower linkage arm may be operatively connected to the shutter and configured to open and close said shutter based upon rotation of said cam. The drive mechanism may comprise a drive chain connected to the truck and configured to rack in and rack out the truck and circuit breaker. The first and second sprockets may interconnect the drive chain, and a support rod may be axially supported by the second sprocket on which said cam is mounted to rotate. A shuttle may be carried by the drive chain and a pin may lock the truck to the shuttle. A worm drive may be operatively connected to the first sprocket and have a worm shaft configured to engage a racking tool for rotating the worm shaft, the sprocket and drive chain and racking in and racking out the truck. A gear reducer may be connected between said worm drive and first sprocket.

The truck may comprise front and rear rollers that support the truck for translational rolling movement along the switchgear frame. The switchgear frame may include rails on which the rollers are supported, said rails having a channel stop configured to chock the rollers when the circuit breaker is in electrical connection with the primary circuit contacts. The circuit breaker may include three-phase vacuum switches. A spring may engage the switchgear frame and truck and may bias the truck and circuit breaker into the primary circuit contacts.

In another example, a method for operating a switchgear system having a switchgear frame and an interior compartment and primary circuit contacts may comprise supporting a truck carrying a circuit breaker for linear movement on the switchgear frame and operating a drive mechanism mounted on the switchgear frame and connected to the truck. The method includes racking in the truck where the circuit breaker is in electrical connection with the primary circuit contacts and racking out the truck where the circuit breaker is electrically disconnected from the primary circuit contacts. The method further includes operating a shutter mechanism connected to the drive mechanism and comprising a primary contact shutter and a shutter linkage interconnected to the drive mechanism and shutter. As the drive mechanism racks in the circuit breaker the shutter linkage moves the shutter opened, and as the drive mechanism racks out the circuit breaker, the shutter linkage moves the shutter closed over the primary circuit contacts.

BRIEF DESCRIPTION OF THE DRAWINGS

Other objects, features and advantages of the present invention will become apparent from the Detailed Description of the invention which follows, when considered in light of the accompanying drawings in which:

FIG. 2B is another front isometric view of the switchgear system similar to that shown in FIG. 2A and showing the trucks racked out to the disconnected position.

FIG. 3 is another front isometric view of the switchgear system similar to that of FIGS. 2A and 2B and showing the trucks racked out to the rotated position.

FIGS. 6A through 6C are side elevation views of the top compartment of the switchgear system of FIGS. 2A, 2B and 3 showing the truck in the connected (FIG. 6A), disconnected (FIG. 6B), and rotated (FIG. 6C) positions.

FIG. 9A is a side elevation view of a section of a circuit breaker drive mechanism mounted in the lower, front switchgear housing of FIG. 1 and connected to another linearly movable circuit breaker truck that carries a circuit breaker as illustrated and showing it racked into a first electrically connected position.

FIG. 9B is another side elevation view of the circuit breaker drive mechanism and truck of FIG. 9A and carrying a circuit breaker and showing a partial cut-away section view of the drive chain.

DETAILED DESCRIPTION

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art.

Figure 1:
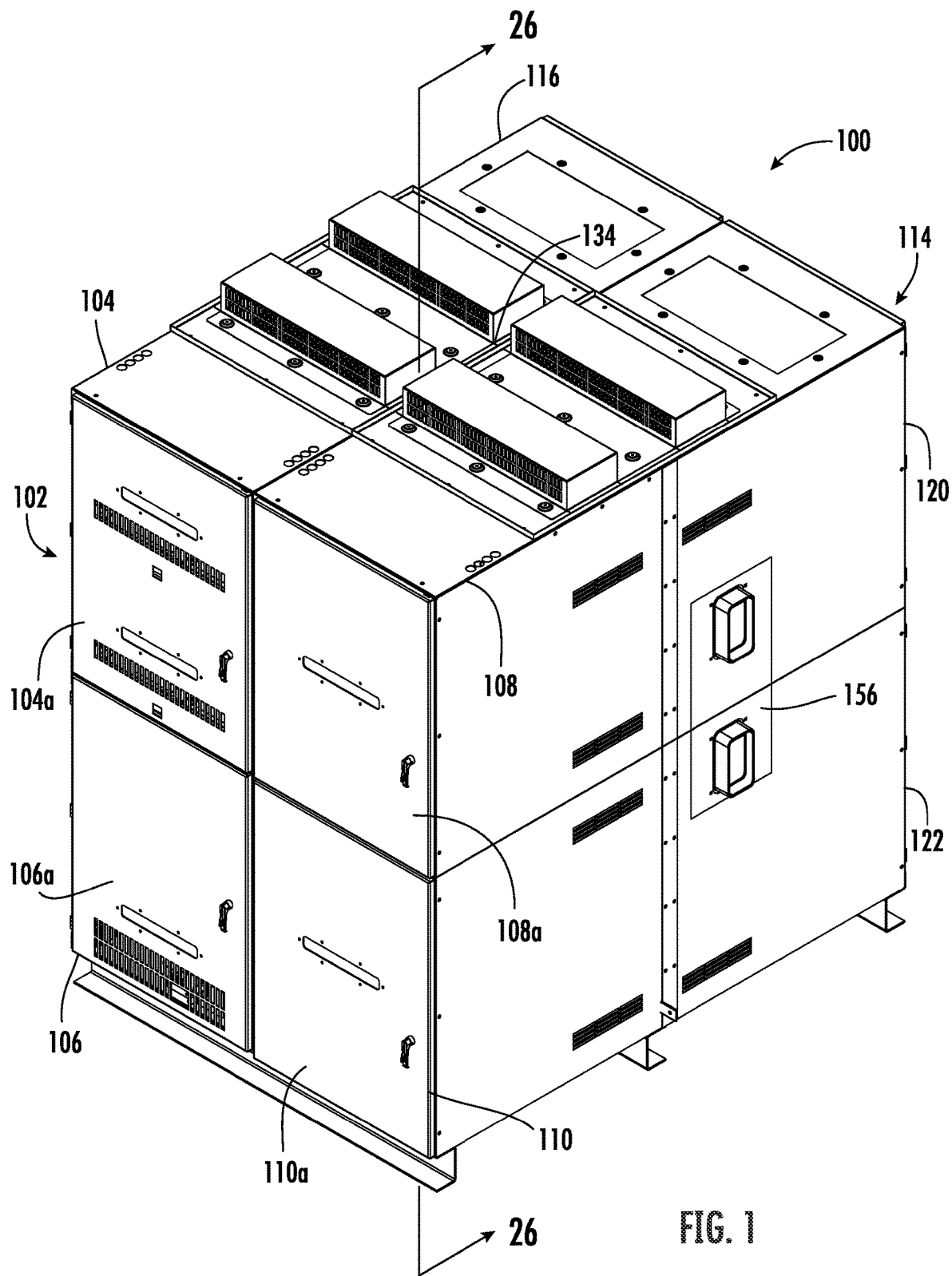
FIG. 1 is an isometric view of an electrical switchgear system, in accordance with a non-limiting example, showing front and rear switchgear sections having first and second sets of front and rear upper and lower switchgear housings joined together.

Referring now to FIG. 1, there is illustrated generally at 100 an electrical switchgear system in accordance with a non-limiting example that includes a front switchgear section 102 having first and second sets of front upper and lower switchgear housings 104, 106, 108, 110 and having joined sidewalls. Referring also to FIG. 1, and the more schematic representation of the switchgear system 100 shown in FIGS. 19-24, a rear switchgear section 114 includes first and second sets of rear upper and lower switchgear housings 116, 118, 120, 122 having joined sidewalls and connected to the rear of the respective front upper and lower switchgear housings 104, 106, 108, 110.

Figure 2A:
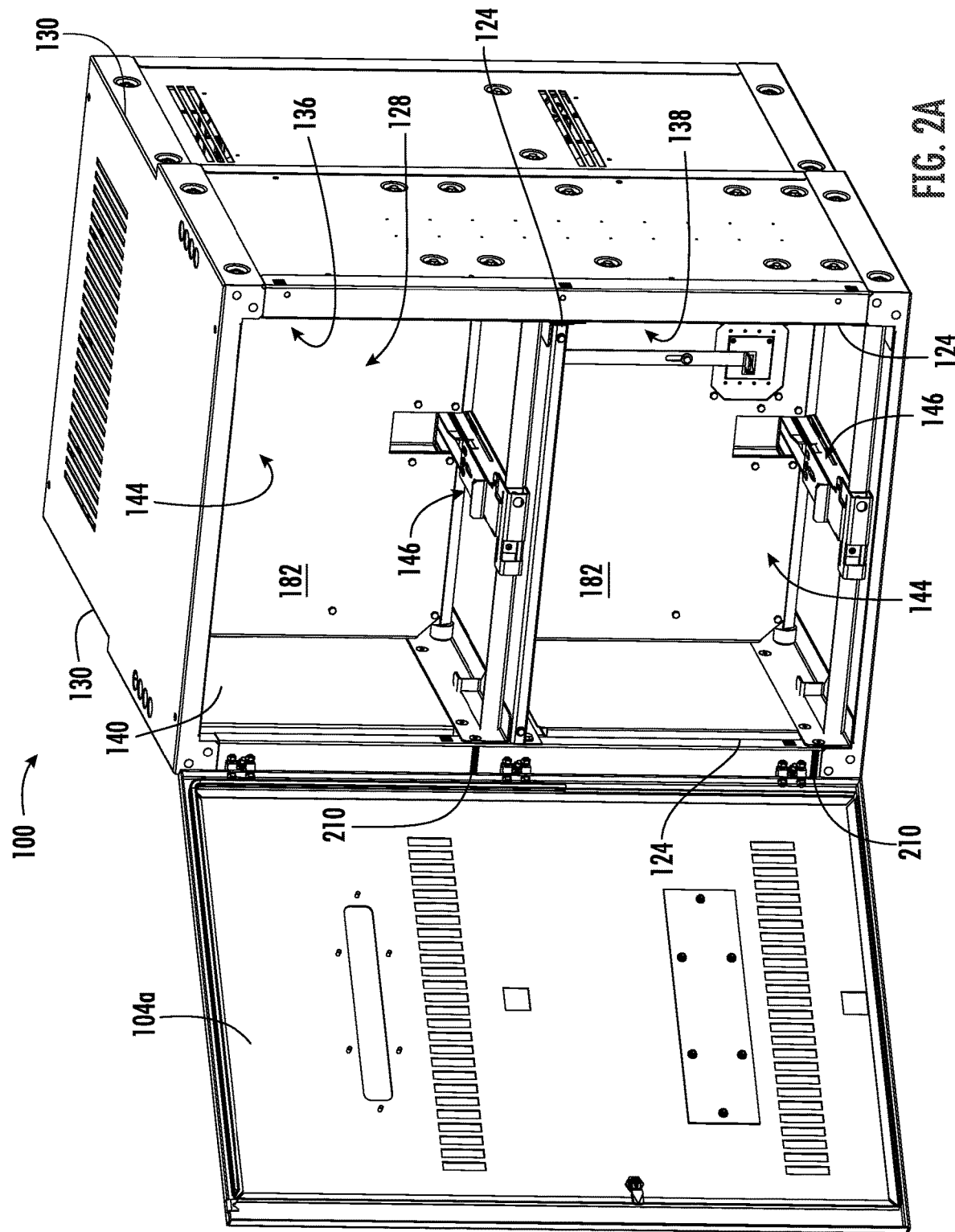
FIG. 2A is a front isometric view of a portion of the switchgear system of FIG. 1 and showing a front, upper switchgear housing having upper and lower compartments and showing trucks racked in the electrically connected position.

As will be explained in greater detail below, joined sidewalls of first and second sets of front upper and lower switchgear housings 104, 106, 108, 110, 116, 118, 120, 122 include a stepped offset section 130 as shown best in FIGS. 2A, 2B, 3 and 23 to form a ventilation duct 134 extending the height of the switchgear system 100. Each switchgear housing 104, 106, 108, 110, 116, 118, 120, 122 includes a switchgear frame 124 that defines an interior compartment 128 as best shown in FIGS. 2A, 2B and 3.

It is possible that front and rear switchgear sections 102, 114 may include "n" sets of both front and rear upper and lower switchgear housings and form a series of switchgear housing sections forming the electrical switchgear system 100. In an example as shown in FIGS. 2A, 2B and 3, the left front upper switchgear housing 104 may include within the interior compartment 128 upper and lower compartments 136, 138 where each of the upper and lower compartments may include the front opening 140 defined at the front of the switchgear housing 104 and a truck 144 and drive mechanism 146 as shown in greater detail relative to FIGS. 2A, 2B, 3, 4A-4C, 5, 6A-6C, 7, and 8. The front left lower switchgear housing 106 includes a circuit breaker truck 150 and circuit breaker drive mechanism 152 such as explained below in the more detailed description of FIGS. 9A, 9B, and 10-17.

The front switchgear section 102 upper and lower switchgear housings 104, 106, 108, 110 and rear switchgear section 114 upper and lower switchgear housings 116, 118, 120, 122 each may include one or more interior compartments 128 and various electrical switchgear components. On the outside of the electrical switchgear system 100, and more particularly, on the outer side of the rear housings 120,122 as shown in FIG. 1, there are shown components that make up part of a main bus extension assembly and phased shorting bus 156 that may extend from a main bus compartment.

The rear switchgear section 114 may include in the various interior compartments of the switchgear housings 116, 118, 120, 122 a main bus assembly, a ground bus assembly interconnect, a potential transformer (PT) and control power transformer (CPT) jump bus assembly, a line bus assembly, a cable compartment, various bus bars and other associated electric components. The front section upper and lower switchgear housings 104, 106, 108, 110 include doors 104a, 106a, 108a, 110a for each switchgear housing to permit access into each interior compartment.

Referring now to FIGS. 2A, 2B and 3, there is illustrated the front switchgear housing 104 of the electrical switchgear system 100 of FIG. 1 and showing a switchgear frame 124 that includes a metal-clad housing and defines the upper and lower interior compartments 136, 138 and includes a front opening 140. Each of the upper and lower compartments 136, 138 includes a translatable and rotatable truck 144 that is movable on the switchgear frame 124 via a drive mechanism 146. The truck 144 in this example may also be referred to as a draw-out auxiliary tray, but hereinafter will be referred to as the truck.

As shown in FIGS. 2A, 2B and 3, the switchgear frame 124 defines within the interior compartment 128 the upper and lower interior compartments 136, 138, and each part of the interior compartment 128 having its front opening 140, formed similar to a box housing structure. In the example of the electrical switchgear system 100 of FIG. 1, individual switchgear housings may be stacked or placed side-by-side with other switchgear housings as shown in the example of the electrical switchgear system of FIG. 1.

In this example of the switchgear housing 104 of FIGS. 2A, 2B and 3, the switchgear housing as part of the electrical switchgear system 100 has its switchgear frame 124 and interior compartment 128 defining the upper and lower interior compartments 136, 138. Each of the upper and lower interior compartments 136, 138 may include at least one electrical switchgear component, which could be any variety of electrical components used in electrical switchgear systems, such as a connector to other devices, primary and/or secondary circuits, and associated contacts, including various electrical buses and control circuits. The electrical switchgear system 100 as explained above may include separate bus or cable compartments as part of the different switchgear housings and may be integrated with other switchgear housings and include interconnected components commonly used in electrical switchgear systems.

The switchgear frame 124 defines the upper and lower compartments 136, 138 and a truck 144 is mounted for translatable and rotatable movement in each of the upper and lower compartments. Each truck 144 carries at least one electrical component, such as a transformers 160 and fuses 162 in the upper compartment 136 or a transformer 164 and fuses 162 in the lower compartment 138, and is supported for movement on the switchgear frame 124. In the example of FIG. 3, the truck 144 in the upper compartment 136 includes three fuses 162 and potential transformers (PTs) 160 corresponding to each phase of the three-phase circuit, while the lower compartment 138 includes a control power transformer 164 and fuses 162.

Figure 6A:
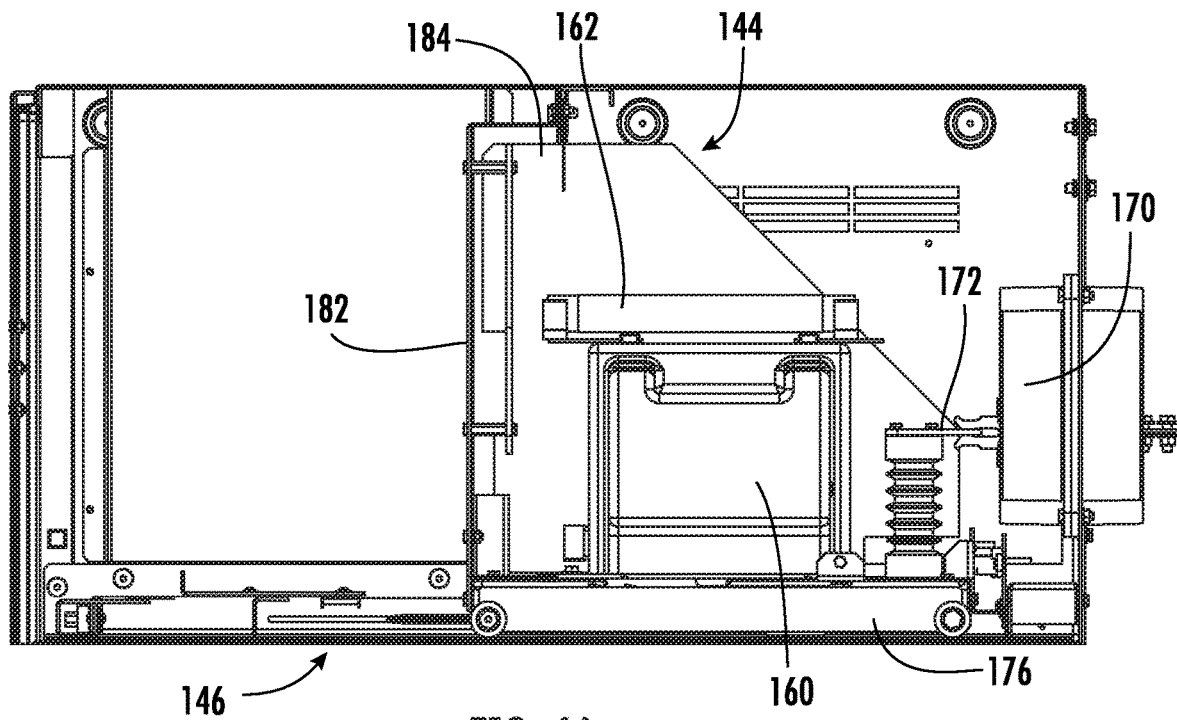

The drive mechanism 146 for each truck 144 in the upper and lower compartments 136, 138 is supported on the switchgear frame 124 and connected to each truck 144 and configured to rack that respective truck into an electrically connected position with the at least one electrical switchgear component 170, such as shown in FIG. 6A, in which electrical connecting tabs 172 for the potential transformers 160 are connected to one or more switchgear electrical components, such as part of an electrical bus, cable or other electrical components, and permit electrical connection of the various transformers 160, 164 and other electrical components carried by the truck 144. Interconnection is made to at least one electrical switchgear component 170, such as a circuit connector, cable or bus, when the truck 144 is in that electrically connected position such as shown in FIG. 6A.

Figure 6B:
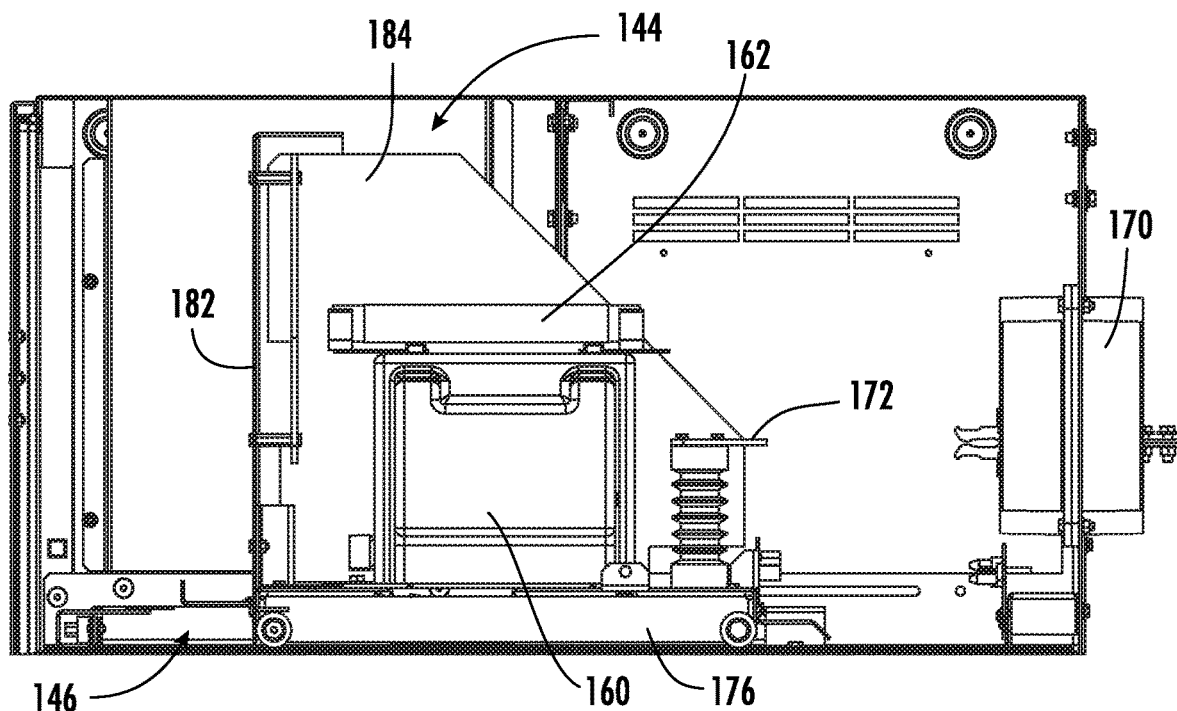

The drive mechanism 146 for each truck 144 located in each of the upper and lower compartments 136, 138 is configured to rack out the respective truck in the respective compartment from the electrically connected position into an electrically disconnected position from the at least one electrical switchgear component 170 as shown in FIGS. 2B and 6B, where both trucks 144 in upper and lower compartments extend slightly toward the front (FIG. 6B).

The electrical connecting tabs 172 carried by the truck in the upper compartment 136 and connected to the potential transformers 160 and fuses is disconnected from the electrical component 170, and thus, the potential transformers 160 and fuses 162 in this example are disconnected from the electrical component 170 as part of the electrical switchgear circuit. A similar function exists with the control power transformer 164 carried by the truck 144 in the lower compartment 138.

In order to allow a maintenance technician or other worker access electrical components carried by the truck 144, such as the fuses 162, control power transformers 164 or potential transformers 160, the drive mechanism 146 rotates the truck 144 upward from its disconnected position into its rotated position (FIGS. 3, 4C, 5, and 6C) to allow operator access through the front opening 140 to the electrical components carried on the truck, such as the fuses and/or transformers.

As shown in FIG. 3, both trucks 144 are mounted in the upper and lower compartments 136, 138 and are rotated upward, and exposed for operator access to the transformers 160, 164 and fuses 162 mounted on the trucks (FIG. 6C). Examples of the connected, disconnected, and rotated positions are also shown in the isometric views of the truck 144 shown in FIGS. 4A, 4B and 4C.

The switchgear housing 104 as illustrated is formed in an example as a metal clad switchgear housing operable at medium voltage. Each truck 144, as best shown in FIGS. 4A-4C, 5 and 6A-6C, includes a deck or floor 176 and supporting front and rear rollers 178a, 178b at the four corners on the underside of the deck or floor 176 that permits the truck to roll on floor rails 180 (FIG. 5) positioned at the lower inside and side edge of each upper and lower compartment 136, 138.

Figure 5:
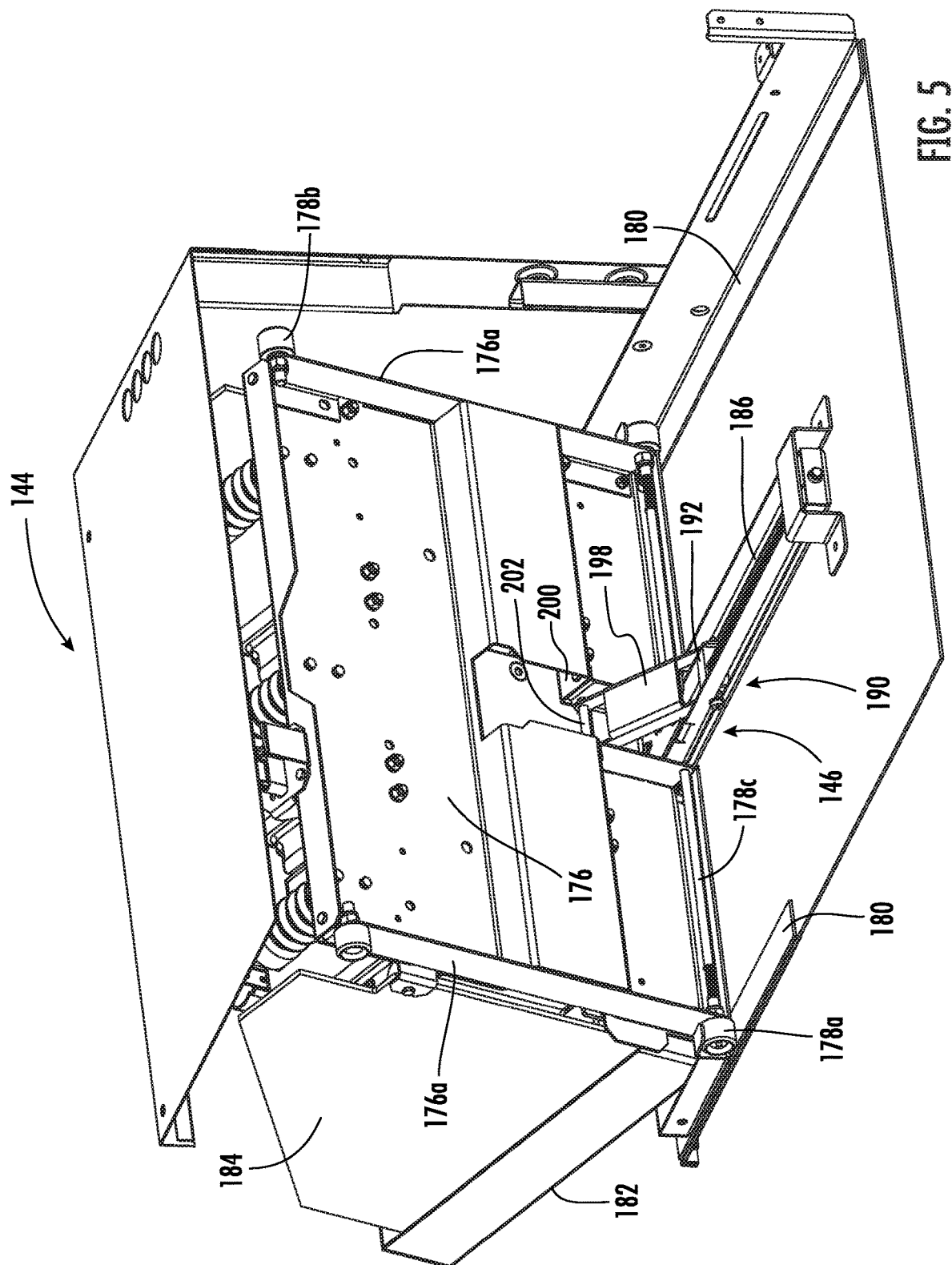
FIG. 5 is an enlarged rear isometric view of the truck of FIG. 4C in the rotated position.

Each floor rail 180 in this example may be formed of a flat strip of metal on which the rollers 178a, 178b engage and roll (FIG. 5). Each truck 144 also includes a front wall 182 to prevent access to the fuses 162 and transformers 160, 164 when the trucks are racked into the electrically connected position. Each truck 144 also includes sidewalls 184 that are trapezoidal shaped with higher sides near the front wall 182 to prevent the operator from reaching around and into the area of the truck holding the transformers 160, 164 and fuses 162 when the truck 144 is in the electrically connected position with any electrical components 170.

Figure 4A:
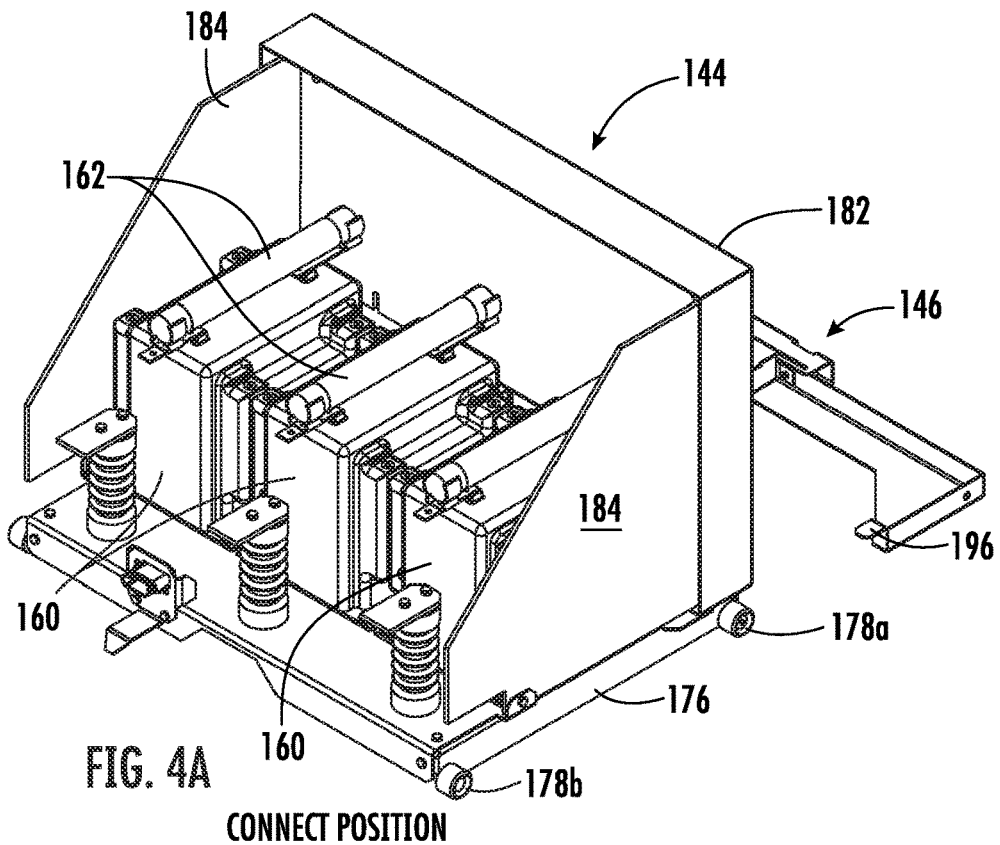
FIGS. 4A through 4C are partial rear isometric views of the trucks in the upper compartment of FIGS. 2A, 2B and 3, and showing the respective connected, disconnected, and rotated positions.
Figure 4B:
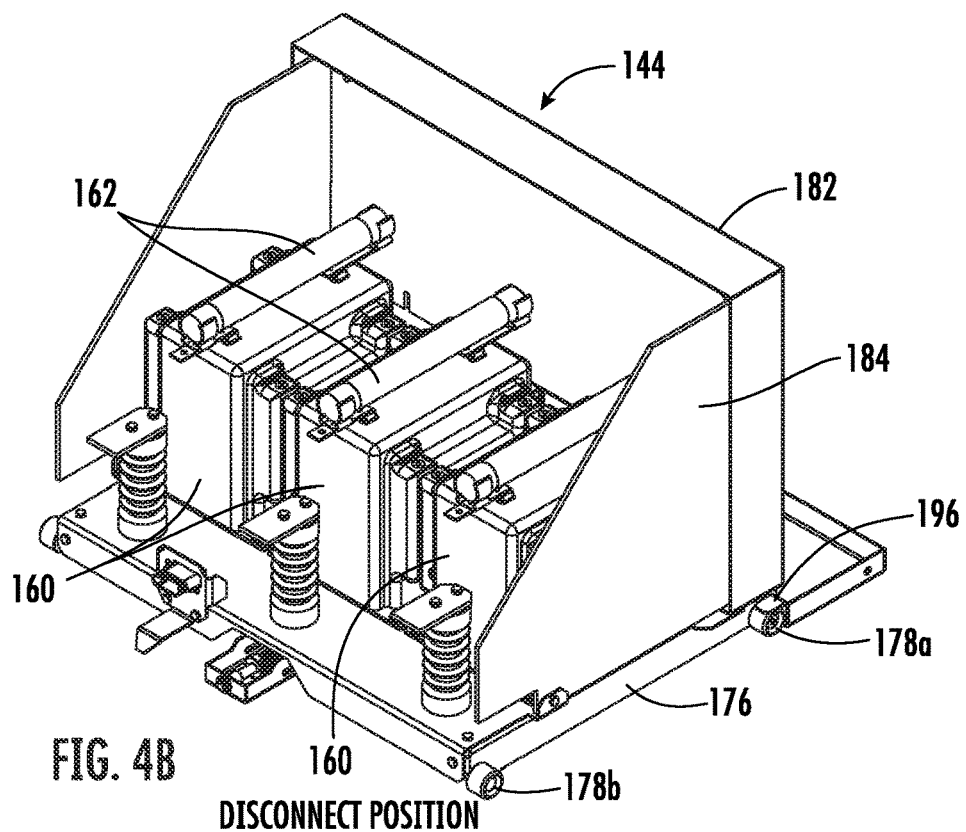
Figure 4C:
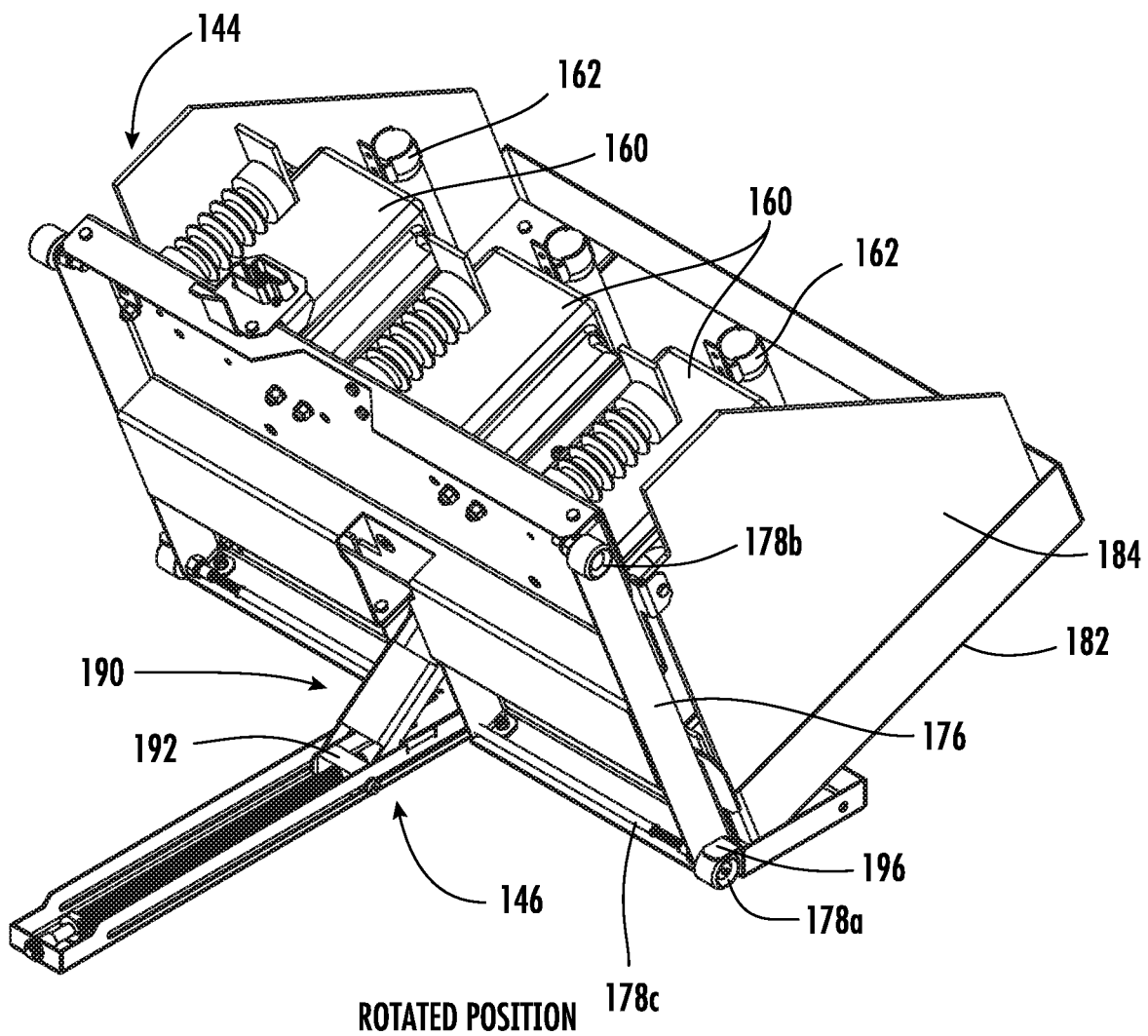
Figure 7:
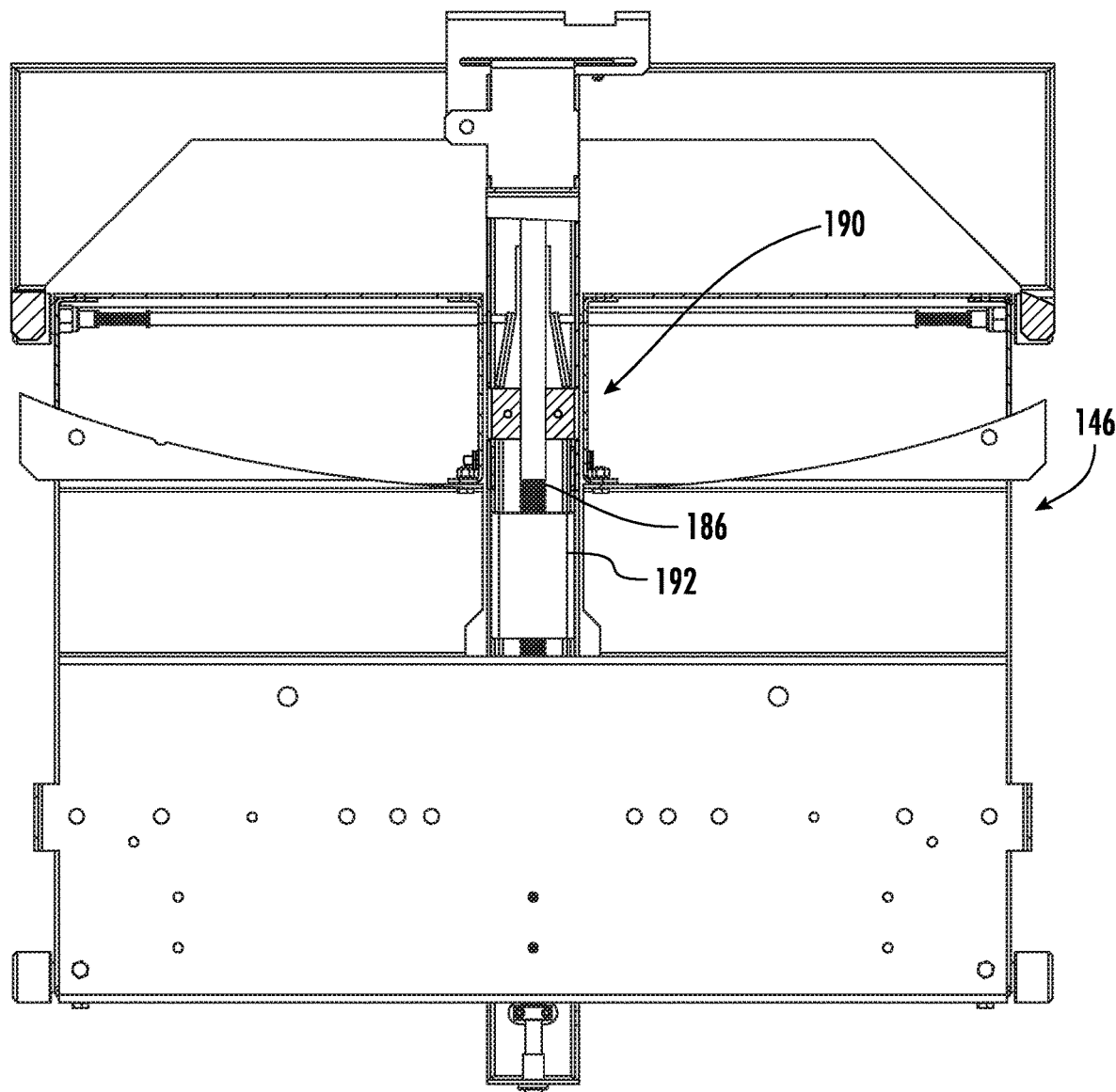
FIG. 7 is a plan view of the drive mechanism shown in FIG. 2A connected to the truck.
Figure 8:
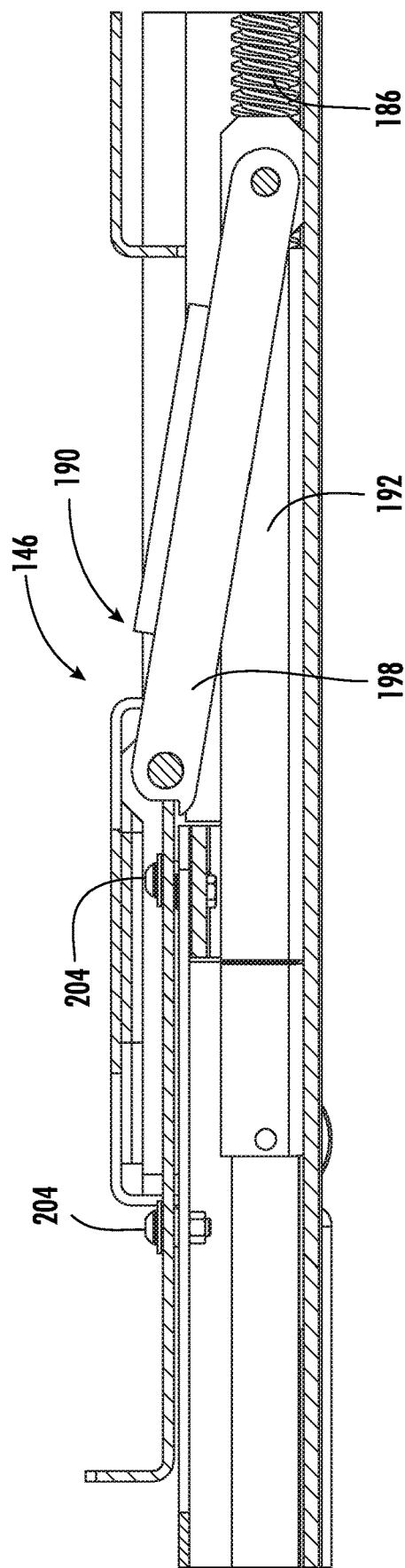
FIG. 8 is a partial side sectional view of the drive mechanism of FIG. 7.
Figure 10:
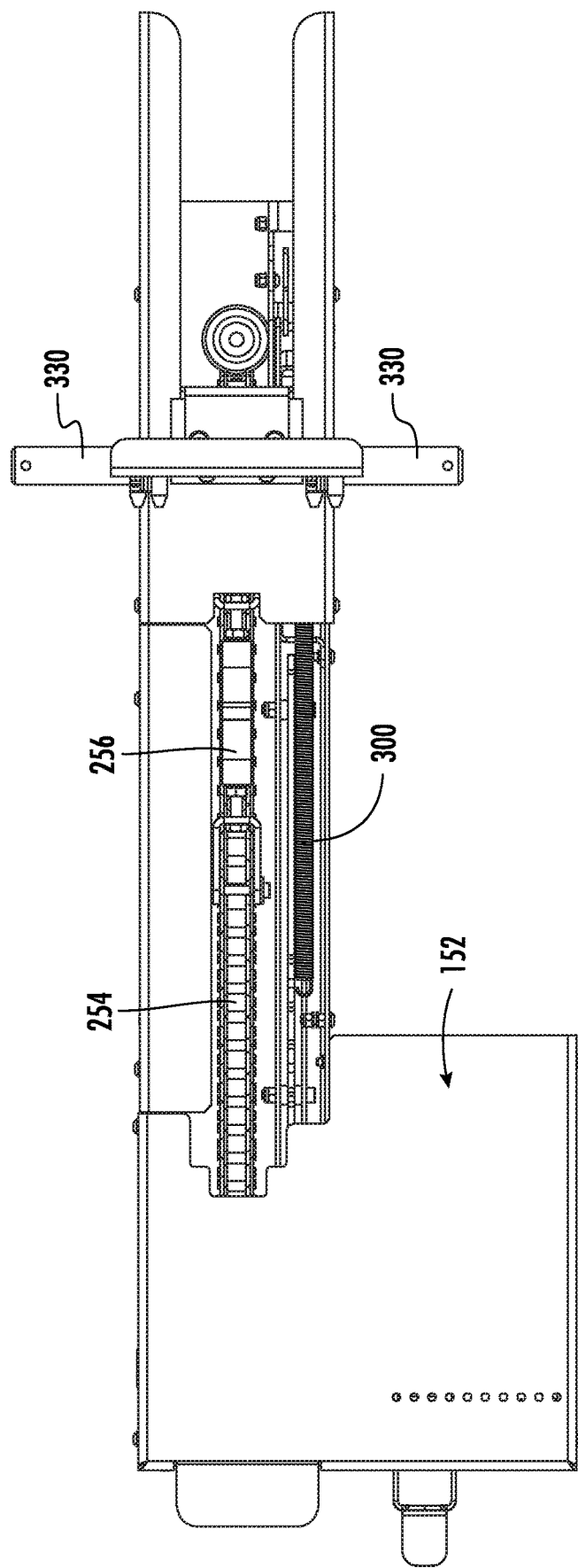
FIG. 10 is a top plan view in partial cut-away section of the circuit breaker drive mechanism and showing a portion of the drive chain.

The drive mechanism 146 includes a leadscrew 186 (FIGS. 5 and 7) and a linkage 190 connected to the truck 144 and leadscrew (FIGS. 4C, 7 and 8). Rotation of the leadscrew 186 racks in and racks out the truck 144 among the electrically connected position, the electrically disconnected position, and the rotated position shown in those three positions illustrated at FIGS. 4A, 4B and 4C. In an example, the drive mechanism 146 includes a leadscrew carrier housing 192 containing a nut having a threaded section that engages to and is carried by the leadscrew 186 and connected to the linkage 190, which in an example is formed as a jack mechanism (FIGS. 5, 7, and 8), and more particularly, similar to a scissor jack as best shown in FIGS. 4C, 6C and 8.

As shown in the sectional view of FIG. 6C, the leadscrew 186 may include a hex nut 194 at the front of the switchgear housing 104 that is configured to engage with an operator racking tool. An operator may rotate the leadscrew 186 from the front by engaging a racking tool with the hex nut and rotating the hex nut and leadscrew to rotate and rack in and rack out the truck 144 into the electrically connected, electrically disconnected, and rotated positions. The switchgear frame 124 forming the upper and lower compartments 136, 138 includes the floor rails 180 and the truck 144 includes the front and rear rollers 178a, 178b that support the truck for translational rolling movement along the floor rails 180 of the switchgear frame 124 between the electrically connected position and electrically disconnected position.

As best shown in FIGS. 4A-C, 5 and 6C, each floor rail 180 on the frame 124 has an associated channel stop 196 towards the front section of the switchgear frame 124, such as formed on the front frame section of the drive mechanism 146. The channel stop 196 engages the front rollers 178a when the truck 150 is in the disconnected position to stop further translational forward movement of the truck outward toward the front opening 140 of the switchgear housing 104.

Upon further rotation of the leadscrew 186, the drive mechanism 146 engages the linkage 190 as a jack mechanism pivots upward the bottom deck 176 and raises the rear of the truck off its rear rollers 178b and rotates upward the truck 144 along a pivot defined by the axis of the front rollers 178a, such as a support rod or an axle 178c connecting the front rollers to each other and onto the underlying deck 176 of the truck, such as via flanged side supports 176a.

As shown in FIG. 8, the linkage 190 as a jack mechanism includes a jack arm 198 as a rectangular configured support arm pivotally connected to the leadscrew carrier housing 192, which in turn, is moved forward by rotation of the leadscrew 186. When the front rollers 178a engage the channel stops 196 at the front end of the floor rails 180, the jack arm 198 is forced upward to rotate the truck 150 about a central axis defined by the rod or axle 178c and a pivot point. A bracket 200 may include a support pin 202 connecting an end of the jack arm 198 onto the bracket positioned on the underside of the deck or floor 176 of the truck 144.

This configuration of the truck 144 and drive mechanism 146 allows the combination of translation and rotation of the truck 144, or draw-out drawer as sometimes referred, to facilitate operator access to the transformers 160, 164 and fuses 162 for maintenance and service. Other electrical components may be carried on the truck 144, which may operate as an auxiliary draw-out tray for different switchgear electrical components. In the various drawings, other components may be included for the truck 144 and drive mechanism 146 to facilitate operation and function. The plan and sectional views of the drive mechanism 146 illustrate different views and show fasteners as bolts 204 (FIG. 8) to aid in retaining separate pieces together.

As illustrated in FIGS. 2A, 2B and 3, the switchgear housing 104 is formed as a metal clad switchgear housing having overlaying metal sheets to form top, bottom and sides, and help form the switchgear frame 124 and includes at the sides the stepped offset 130. Each switchgear housing 104, 106, 108, 110, 116, 118, 120, 122 shown in FIG. 1 may include this formed stepped offset 130 to help in convective ventilation of air and gases, such as hot arc gases, which may occur during a short circuit.

Figure 26:
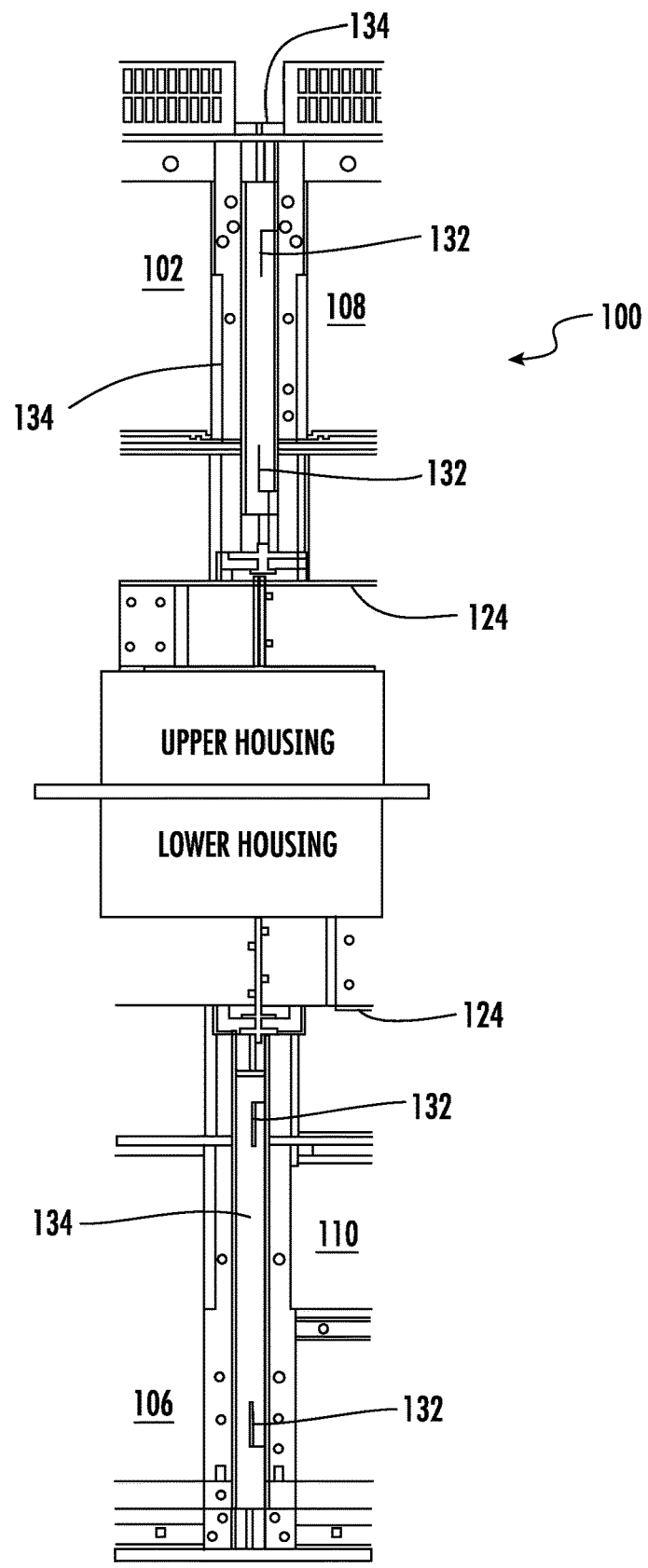
FIG. 26 is a partial sectional view of the switchgear system taken along line 26-26 of FIG. 1 showing in greater detail the central ventilation duct and vent covers to direct air and gas by convection out of the ventilation duct.

The stepped offset 130 forms the ventilation duct 134 extending the height of the front of the electrical switchgear system 100 (FIGS. 1 and 26) to vent the interior compartments 128 of each switchgear housing via the vents 131a, 131b formed in the side of the stepped offset 130. The doors 104a, 106a, 108a, 110a to each of the switchgear housings 104a, 106a, 108a, 110a forming the front section 102 electrical switchgear system 100 each may include differently configured vents. In an example of the switchgear housing 104 of FIGS. 2A, 2B and 3, an interlock mechanism shown schematically at 210 interconnects the drive mechanism 146 in each of the upper and lower compartments 136, 138 to the respective door 104a and prevents the drive mechanism 146 from rotating the truck into its rotated position unless the door is open.

This function prevents damage to components such as the transformers 160, 164 and fuses 162 when an operator rotates the leadscrew 186 before the truck 144 is rotated upward from its disconnected position into its rotated position and prevents the truck and any electrical or other components carried thereon from engaging directly with any electrical components or circuits that may be mounted on the interior section of the door 104a or hitting the inside of the door and damaging components carried by the truck 144.

As shown in FIG. 3, the trucks 144 and the carried electrical components, such as fuses 162 and transformers 160, 164, are partially positioned out of the front opening of each upper and lower compartment, and if the trucks are rotated while the door 104a is closed, serious damage may occur to the transformers, fuses and other components carried by the truck, and to any electrical components that are carried on the interior of the door. The interlock 210 may be formed as an electronically controlled latch or a spring loaded mechanism, such that when the door 104a is opened, the spring is released to allow the truck to be further translated and then rotated.

In another example, a maintenance technician may be forced to open the door 104a and manually pull back on a safety slide (not shown), which removes a lock and allows rotation of the truck as a racking tool engaged to the hex nut 194 of the leadscrew 186 is rotated. The use of manual action from a maintenance technician may enhance safely since the technician must make a positive action of turning manually the racking tool and leadscrew to move and then rotate the truck 144.

As noted before, the switchgear system 100 includes in this example a lower, front switchgear housing 106 also having a switchgear frame 124 and defining an interior compartment 128 and including in this example a primary circuit 220 and a secondary control power or test circuit 222 that operates as a test circuit (FIG. 9A). The primary circuit 220 may connect to primary bus components and output cables shown generally at 224, and the secondary circuit 222 may connect to other control and test circuits shown generally at 226. These electrical components may be contained in sections of the rear switchgear housings 116, 118, 120, 122 and may operatively connect to a circuit breaker transformer and other components.

As shown in FIGS. 9A and 9B, a circuit breaker truck 150 is configured differently than the trucks 144 of FIGS. 1-8. This circuit breaker truck 150 is configured for linear movement in the interior compartment 128 without being rotatable. For purposes of description, this truck 150 will hereinafter be referred to as the C.B. truck 150 with C.B. corresponding to circuit breaker. This C.B. truck 150 is supported for linear movement on the switchgear frame 124, in this example, movable on side rails 230 as shown in the interior view of a portion of the interior compartment 128 at FIG. 14, illustrating a side rail 230 mounted on the interior inner side of the switchgear frame 124 and on which the front and rear rollers 232a, 232b are supported for translational rolling movement along the side rails 230 of the switchgear frame 124.

A side rail 230 is mounted on each interior side of the switchgear frame 124 and positioned a few inches above the bottom floor switchgear housing 106 formed by the switchgear frame and metal cladding. In the example shown in FIGS. 9A, 9B, and FIGS. 10-14, the circuit breaker drive mechanism 152 is mounted on the bottom floor of the switchgear frame 124 forming the switchgear housing 106 and connected to the C.B. truck 150, and configured to rack the C.B. truck and the circuit breaker 250 it carries into a first connected position where the primary circuits 220 and secondary control or test circuits 222 are electrically connected (FIGS. 9A and 9B), a test position where primary circuits are electrically disconnected and the secondary circuits are connected and a fully disconnected position where both primary and secondary circuits are disconnected.

The circuit breaker drive mechanism 152 for purposes of description is hereinafter referred to as the C.B. drive mechanism 152 and is also configured to rack out the C.B. truck 150 and the circuit breaker 250 into a second test position where the primary circuit 220 is electrically disconnected and the secondary circuit 222 is connected to the secondary control or test circuits, for example, such as for testing.

Figure 13:
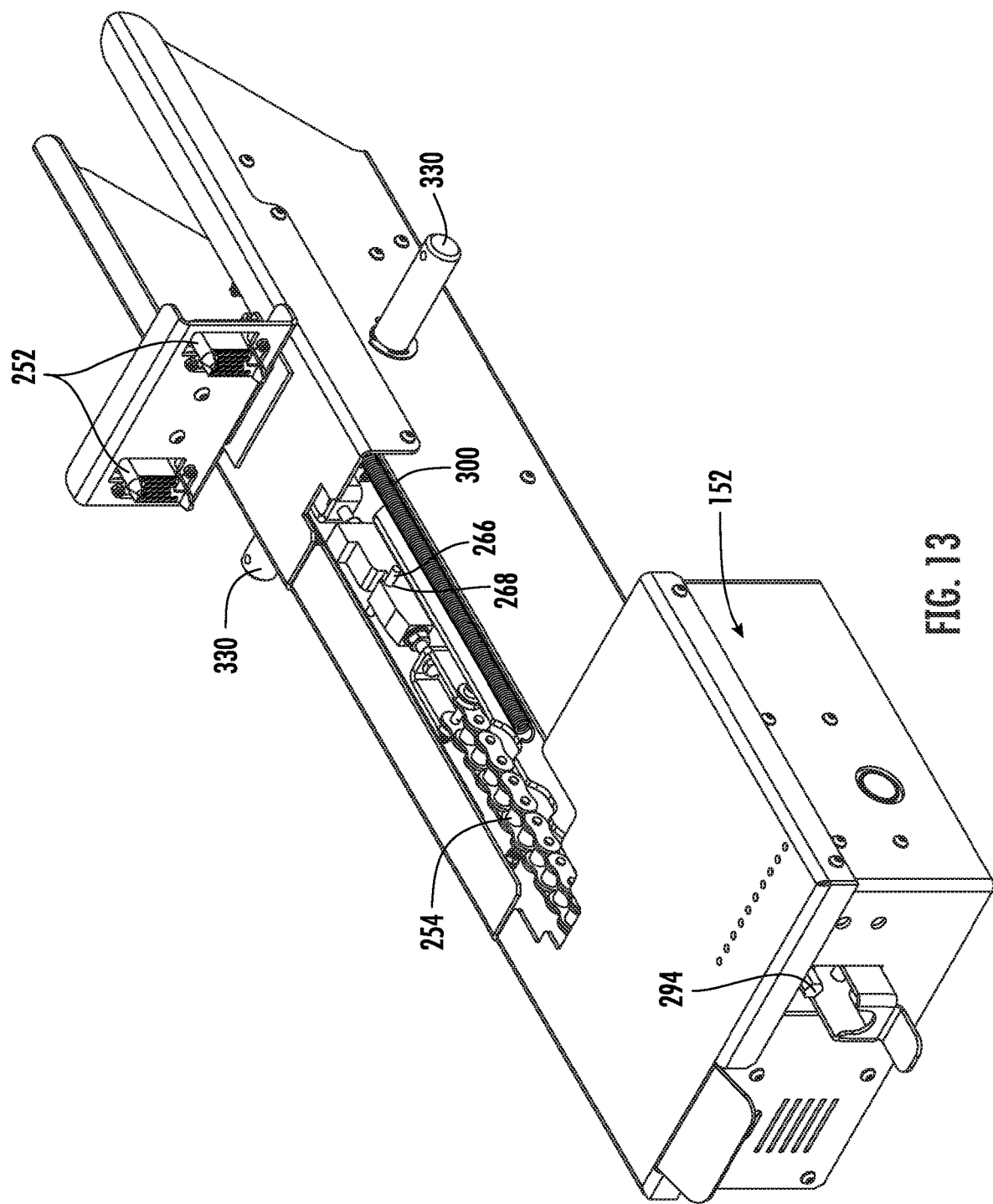
FIG. 13 is an isometric view of the circuit breaker drive mechanism showing a partial cut-away of the drive chain and shuttle.
Figure 14:
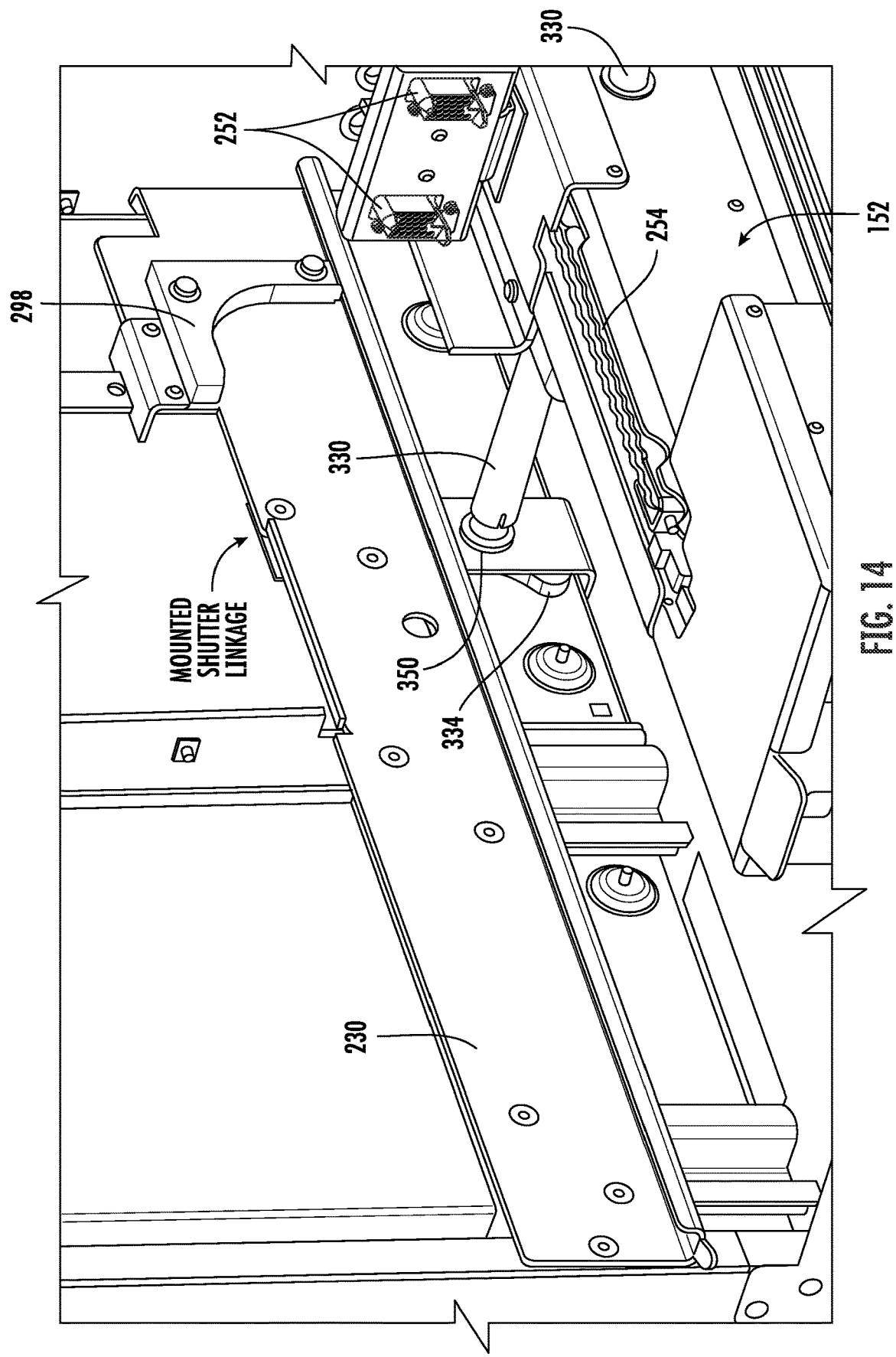
FIG. 14 is an isometric view showing a portion of the interior compartment of the front, lower switchgear housing section showing the switchgear frame, circuit breaker drive mechanism and its drive chain and shuttle, and rails on the switchgear frame for supporting the rollers of the circuit breaker truck.

An example of secondary connectors 252 as part of the secondary circuit 222 are best shown in FIGS. 13 and 14, allowing a cable or other secondary connection to connect and complete the secondary circuit for testing and/or control. The C.B. drive mechanism 152 is also configured to rack out the C.B. truck 150 into a third disconnected position where the primary and secondary circuits 220,222 are electrically disconnected.

Figure 11:
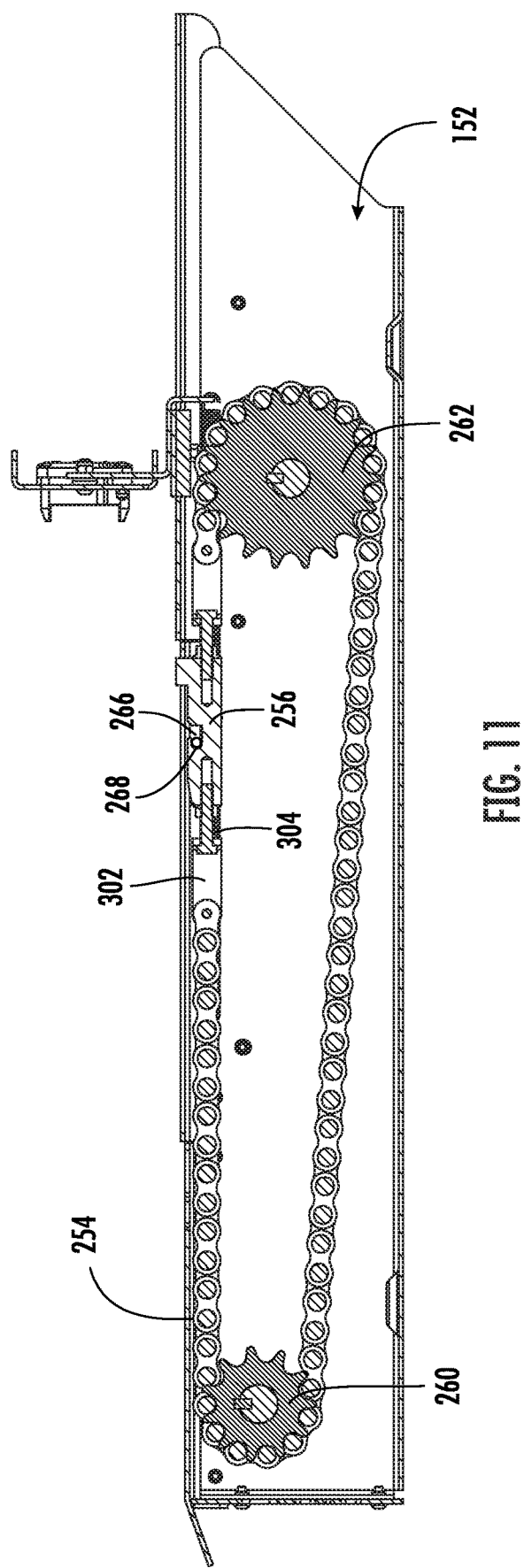
FIG. 11 is a side sectional view of the circuit breaker drive mechanism of FIG. 9A showing the drive chain, shuttle and first and second sprockets interconnecting the drive chain.

In this example as best shown in FIG. 11, the C.B. drive mechanism 152 includes a drive chain 254, and a shuttle 256 that connects two separated ends of the drive chain. The shuttle 256 is configured to engage the underside of the C.B. truck 150. As the drive chain 254 rotates, the C.B. truck 150 will rack in and fix the circuit breaker 250 into its first connected position where the primary circuit 220 and the secondary circuit 222 are electrically connected.

First and second sprockets 260, 262 interconnect the drive chain 254 (FIG. 11), corresponding to front and rear sprockets, with the first or front sprocket 260 slightly smaller in diameter than the second or rear sprocket 262. Thus, the driving force or "holding" force exerted by the first, front smaller sprocket 260 onto the larger second rear sprocket 262 enhances the holding or binding force that acts on the C.B. truck 150. Large forces may be generated by a short circuit, for example.

A pin 266 is shown diagrammatically in FIGS. 11 and 13, and may be fixedly carried at the underside of the C.B. truck 150 and may lock the C.B. truck 150 to the shuttle 256 at a position adjacent the second or rear sprocket 262 when the circuit breaker 250 is in the first electrically connected position and electrically connected to primary circuit 220 and secondary circuit 222. The shuttle 256 includes a slot 268 that engages the pin 266 as the drive chain 254 and shuttle 256 are rotated forward, thus locking the shuttle 256 and C.B. truck 150 together and maintaining a biasing force, such as when the circuit breaker 250 is connected with the primary circuit 220 and an excessive force is generated such as a short circuit arc, which generates extreme stresses on the C.B. truck 150 and C.B. drive mechanism 152.

The circuit breaker 250 as illustrated in FIGS. 9A and 9B is a three-phase circuit breaker and includes first, second and third vacuum interrupters 270 that define three poles 272 for the three-phase circuit as first, second and third single-phase circuits with the upper portion of the poles each having a contact arm 274 that connects to a bus bar circuit, for example, as part of an input as a power supply and the primary circuit and the lower portion of the poles each having a contact arm 276 having connectors to connect to a cable assembly or other electrical circuit as part of the output and connected to a load.

Figure 16:
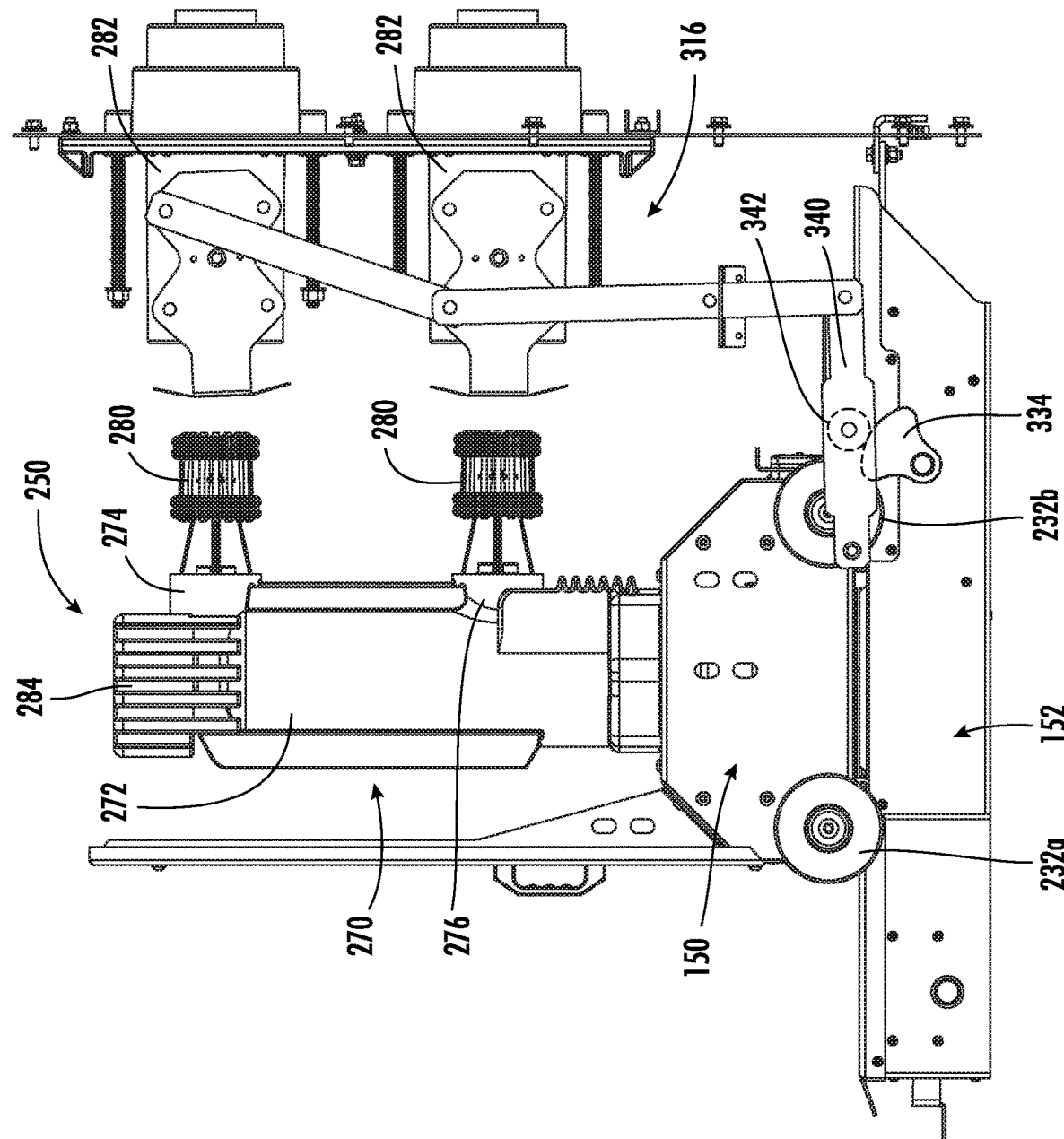
FIG. 16 is another side elevation view of the circuit breaker drive mechanism and truck carrying the circuit breaker and the shutter closed over the primary circuit contacts when the circuit breaker drive mechanism racks out the circuit breaker.

Although only one vacuum interrupter 270 and one pole 272 is illustrated in FIGS. 9A and 9B and associated pole, there are three vacuum interrupters 270 and poles across the width of the truck 150. Each vacuum interrupter 270 and pole 272 includes an upper contact arm 274 and lower contact arm 276 and include connectors that include a contact finger assembly shown generally at 280 and as best shown in FIG. 16, which are received into primary circuit bushings 282 that are formed as a primary circuit housing to hold fixed primary circuit contacts 220a as shown in the dashed lines, and which engage the contact finger assemblies 280 (FIGS. 9A and 9B).

The contact arms 274,276 may carry a contact finger assembly 280 formed as tulip contacts in different configurations although a preferred design is illustrated in the example shown in FIG. 18 and explained in greater detail below. Each vacuum interrupter 270 operates as a switch and incorporates a movable electrical contact and a fixed electrical contact in a vacuum. The separation of the electrical contacts results in a metal vapor arc, which is quickly extinguished. This medium-voltage switchgear system 100 includes the medium-voltage, three-phase vacuum circuit breaker 250 having three vacuum-interrupters 270. Each vacuum interrupter 270 provides the fixed and moving contact in a flexible bellows to allow movement of the movable contact and in a hermetically-sealed ceramic with a high vacuum. Usually the bellows is made of stainless steel.

Current commercially available vacuum interrupters have a very long Mean Time to Failure (MTTF), and include high technology ceramic housings that imparts a vacuum tightness with a resolution to the range of $10^{-7}$ hPa. The three-phase vacuum circuit breaker 250 as illustrated may operate with protective relays and other sensors to detect overcurrent or other abnormal or unacceptable conditions and signal the circuit breaker 250 and its vacuum interrupters 270 to switch open.

To maintain heat control, each pole 272 may include an insulator 284 as illustrated. The protective relays and sensors may be formed as current transformers and potential transformers and temperature or pressure instruments and other sensing devices that may operate in the electrical switchgear environment. The vacuum interrupters 270 may operate at 5 KV, 15 KV, 27 KV, and 37 KV corresponding to the normal operating range of medium-voltage switchgear systems 100.

Figure 12:
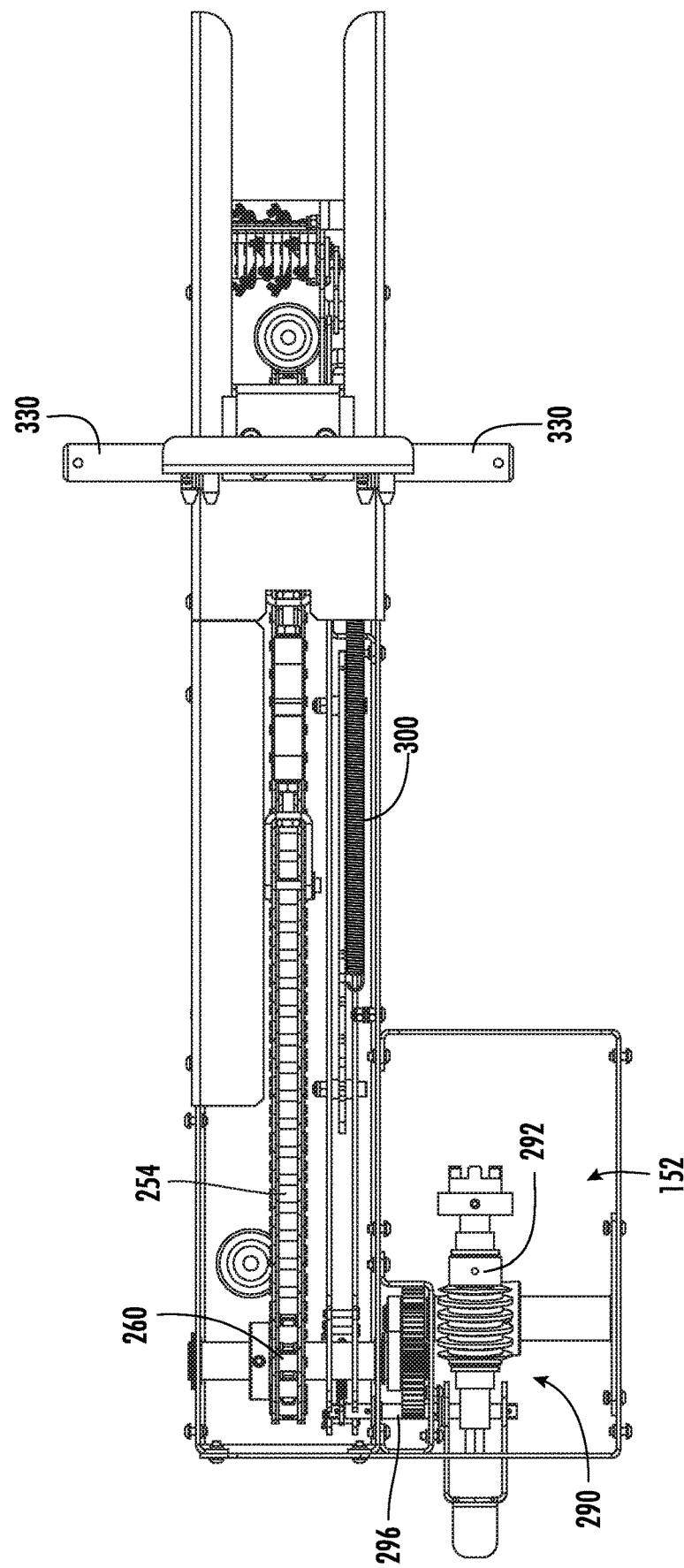
FIG. 12 is another top plan view in full cut-away section showing the circuit breaker drive mechanism and the drive chain and worm drive.

In this example best shown in FIG. 12, the C.B. drive mechanism 152 includes a worm drive mechanism 290 operatively connected to the first or front sprocket 260 (FIG. 12). The worm drive mechanism 290 includes a worm shaft 292 configured at its end to have a nut 294 (FIG. 13) or other device to engage a racking tool that allows an operator to rotate the worm shaft 292 the front sprocket 260 and the drive chain 254, and rack in and rack out the C.B. truck 150 and three-phase circuit breaker 250 into the first electrically connected position, the second test position, and the third disconnected position. Because the C.B. truck 150 and circuit breaker 250 are both very large and heavy components, a gear reducer 296 (FIG. 12) may be connected between the worm drive mechanism 290 and first sprocket 260 to provide gear reduction and torsional force to move the C.B. truck when connected to the shuttle 256 and reduce the amount of force and torque an operator must use to rotate the worm shaft 292.

As shown in FIGS. 13 and 14, the electrical contact connectors 252 may be supported on the C.B. drive mechanism 152 to make contact with other connectors on the C.B. truck when racked forward, including secondary circuit 222 connectors. The C.B. truck 150 includes front and rear rollers 232a, 232b that support the C.B. truck for translational rolling movement along the side rails 230 positioned on the inside interior sidewalls of the switchgear frame 124, and in this example, a pair of side rails on which the rollers are supported.

Each side rail 230 includes a channel stop 298 positioned at the end of each side rail with one channel stop shown on the one side rail illustrated in FIG. 14 and configured to "chock" or stop the rear rollers 232b when the C.B. truck 150 is racked into the first connected position and the circuit breaker 250 connected to primary circuits 220. The gear reducer 296 and sprockets 260, 262 impart a mechanical advantage for the operator when inserting a heavy and large circuit breaker 250 such as when racking the circuit breaker into its electrically connected position with the primary circuits 220.

The electrically connected position when the C.B. truck 150 and circuit breaker 250 are racked in completely is advantageous for mechanically fixing the circuit breaker 250 into electrical contract with the primary circuits 220 due to the proximity of the rear sprocket 262 to the latched pin 266 and the secured connection of the C.B. drive mechanism 152 to the switchgear frame 124. Very powerful electrical forces may be generated, such as during a short circuit, and the C.B. drive mechanism 152 engaging the C.B. truck 150 carrying the circuit breaker 250 is forced to stay within its connected position even when the powerful short circuit forces exert force against the C.B. truck.

A spring 300 (FIGS. 10, 12 and 13) may engage the switchgear frame 124 and C.B. truck 150 or other electrical switchgear components and aid in biasing the circuit breaker 250 and C.B. truck into connected and other positions. The shuttle 256 connects to end sections of the drive chain 254 (FIG. 11) and the shuttle may be held in place by chain retainers 302 on each end of the drive chain 254. Threaded tensioning bolts 304 may connect the chain retainers 302 to the shuttle 256 and the bolts may be turned to either increase chain tension, making the drive chain 254 more taut, or decrease chain tension, making the drive chain less taut.

The drive chain 254 may be pulled tighter and more taut relative to the shuttle 256 by rotating the threaded tensioning bolts 304 in a first direction, or the tension released and backed off by rotating the threaded tensioning bolts in the opposite direction. This configuration of the C.B. truck 150 is also advantageous because the C.B. truck carrying the circuit breaker 250 is separate from the C.B. drive mechanism 152, instead of being incorporated as one integral unit as in some commercially available circuit breaker and switchgear designs. This structure and configuration as described with reference to the example shown in FIGS. 9A, 9B and 10-14 also facilitates maintenance.

Figure 15:
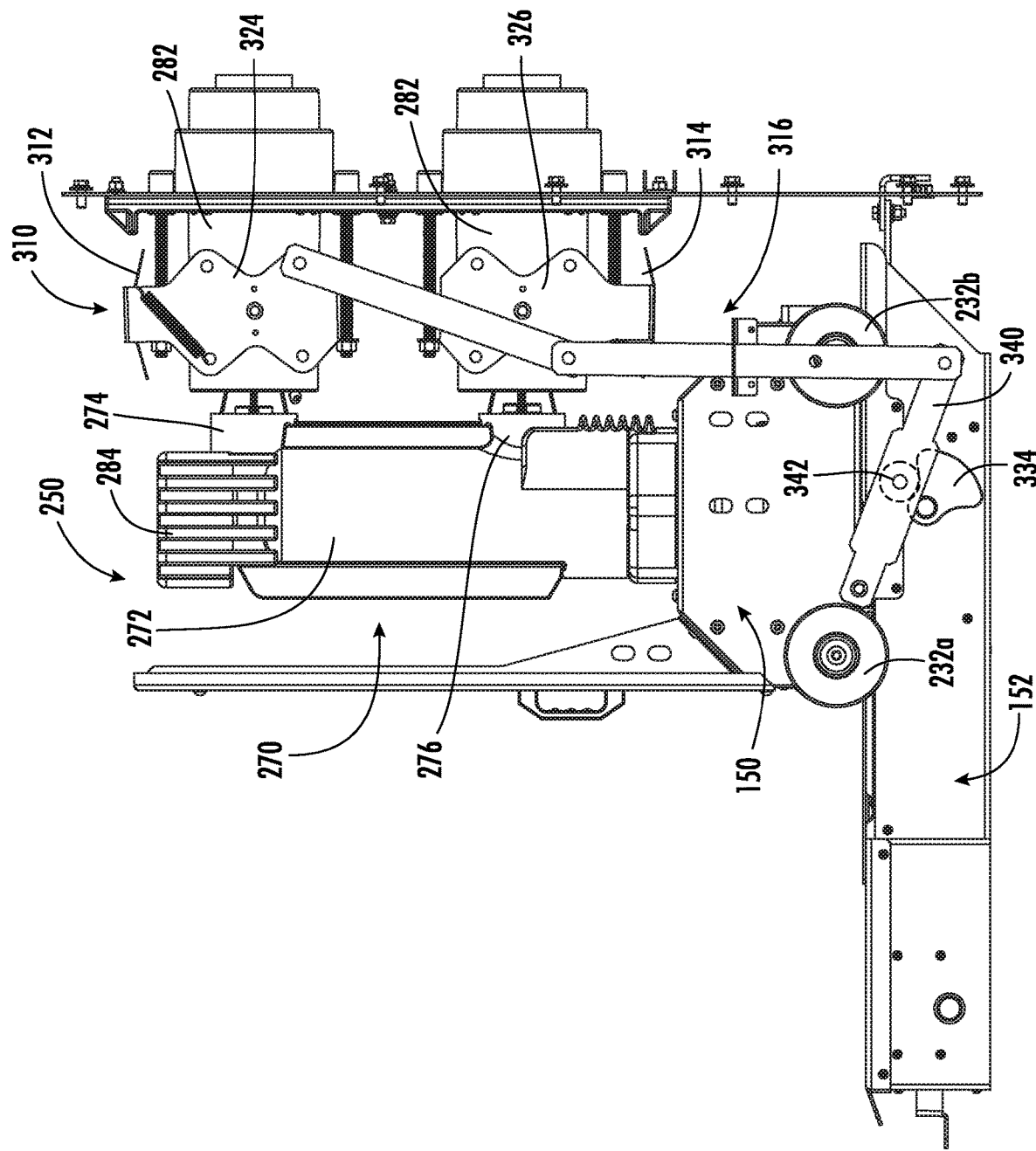
FIG. 15 is a side elevation view of the truck carrying a circuit breaker in electrical connection with the primary circuit contacts, and showing the open shutter.
Figure 17:
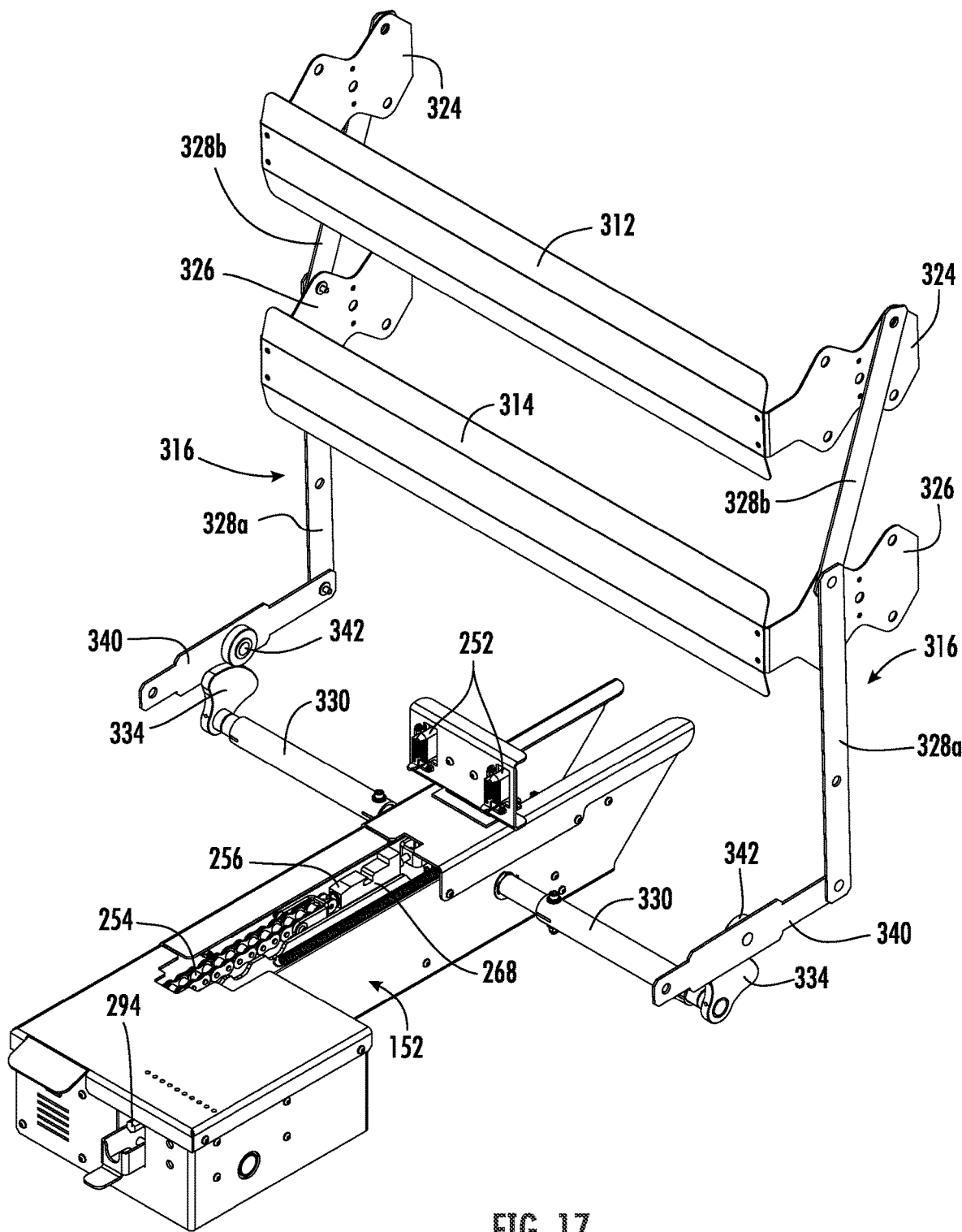
FIG. 17 is an isometric view of a portion of the circuit breaker drive mechanism and interconnected shutter mechanism.

Referring now to FIGS. 15-17, there is illustrated a shutter mechanism 310 that operates as a protective shutter over the fixed primary circuit contacts 220a contained in the primary circuit bushings 282, e.g., support housings, as part of the switchgear system 100. As noted before, the C.B. truck 150 carrying the circuit breaker 250 is supported for linear movement on side rails 230 of the switchgear frame 124, and the C.B. drive mechanism 152 is mounted on the switchgear frame 124 and connected to the C.B. truck 150 similar in configuration to the embodiment shown in FIGS. 9A-14.

The shutter mechanism 310 is connected to the C.B. drive mechanism 152, and includes two parallel shutters 312, 314 and formed as two parallel elongated sheets (FIG. 17) that are configured to cover the fixed primary circuit contacts 220a, and a shutter linkage 316 operatively connected to the C.B. drive mechanism 152 and shutters 312, 314. The shutters 312, 314 are formed of an elongated strip that includes a central section and opposing edge strip sections to form a concave like structure to cover the primary circuit fixed contacts 220a contained in the bushings 282.

As the C.B. drive mechanism 152 racks in the C.B. truck 150 and circuit breaker 250 into the electrically connected position, the shutter linkage 316 moves the shutters 312, 314 open (FIG. 15) to allow the contact finger assembly 280 to engage the fixed primary circuit contacts 220a carried within the bushings 282. As the C.B. drive mechanism 152 racks out the C.B. truck 150 and circuit breaker 250, the shutter linkage 316 moves the shutters 312, 314 closed over the fixed primary circuit contacts 220a (FIG. 16). The fixed primary circuit contacts 220a include upper and lower fixed primary circuit contacts contained in the bushings 282 and covered by the respective upper and lower shutters 312, 314.

The upper primary circuit contacts 220a, for example, may connect to a primary bus component that connects to the incoming power line and medium-voltage switchgear, and the lower fixed primary circuit contacts may be coupled to an outgoing line, such as connected by cables and exiting the switchgear system 100 to various loads. The fixed primary circuit contacts 220a are contained in the upper and lower bushings 282 that contain the fixed primary circuit contacts, and the respective upper and lower shutters 312, 314 are pivotally mounted on the bushings 282 via opposing upper and lower shutter brackets 324, 326 that are pivotally mounted on the bushings 282 and pivotally moveable to pivot upper and lower shutters 312, 314 over the respective upper and lower fixed primary circuit contacts 220a. In this example, because the circuit breaker 250 is a three-phase circuit breaker, there are six fixed upper and lower primary circuit contacts 220a arranged in two rows having three phases each, corresponding to the three-phase primary circuit and the three vacuum interrupters 270 and poles 272, corresponding to each single-phase of the three-phase circuit.

As illustrated in FIG. 17, a cam support rod 330 is axially supported by the second rear sprocket 262 and extends traversely out from either side of the second rear sprocket 262 and from the C.B. drive mechanism 152. A cam 334 is mounted at either end of the cam support rod 330. A cam follower linkage arm 340 that includes a cam follower roller 342 that engages the cams 334 is pivotally connected to each interior sidewall in order to engage the cams.

The cam follower linkage arm 340 is positioned on each interior side and connects to the shutter brackets 324, 326 via the shutter linkage 316 and is configured to open and close the shutters 312, 314 based upon rotation of the cam 334. Each shutter linkage 316 includes first, lower and second, upper vertical linkage arms 328a, 328b as shown in FIGS. 15-17 with the lower end of the first arm 328a connected to an end of the cam follower linkage arm 340 and the other end connected to the second, upper linkage arm 328b. Each cam follower linkage arm 340 may be pivotally mounted to a bracket 350 (FIG. 14) that holds an end of the cam support rod 330 on the interior side on the frame 124 and housing wall, such as between the side rail 230, which is spaced from the interior sidewall of the switchgear frame 124 forming the switchgear housing.

When each cam 334 is rotated up, each cam follower linkage arm 340 moves up and forces the first and second arms 328a, 328b of the shutter linkage 316 up. The upper end of the first lower arm 328a and lower end of the second upper arm 328b are connected to side of the shutter bracket 326 to rotate the shutter 314 clockwise, while the shutter 312 rotates counter-clockwise from the upper arm movement 328b connected to side of shutter bracket 324. Thus, the top shutter 312 rotates counter-clockwise over the fixed primary circuit contacts 220a and the lower shutter 314 rotates clockwise over the fixed primary circuit contacts (FIG. 16).

The configuration of the shutters 314,316 as having a central mounting position at a medial portion and the side segments that connect to the lower and upper arms 328a, 328b aids in this pivoting movement. When each cam 334 is rotated down, each cam follower linkage arm 340 pivots down and pivots the shutters 312, 314 pivotally mounted on the bushings 282 in a direction away from the primary circuit contact as the C.B. drive mechanism 152 racks the C.B. truck 150 and the circuit breaker 250 into electrical connection with the fixed primary circuit contacts 220a.

In this example, each cam follower linkage arm 340 is pivotally connected at one end at one location such as on the frame and interior sidewall, and the other end connected to the first lower arm 328a of the shutter linkage 316. The upper end of the first lower linkage arm 328a is connected to the shutter bracket 326 and to the lower end of the second upper linkage arm 328b, which connects onto the shutter bracket 324.

Both shutter brackets 324, 326 are pivotally connected to the respective fixed contact bushings 282. The C.B. drive mechanism 152 includes the components as described above, including the drive chain 254 connected to the C.B. truck 150 and configured to rack in and rack out the C.B. truck 150 and circuit breaker 250, and the first and second sprockets 260, 262 interconnecting the drive chain 254. The shuttle 256 is carried by the drive chain 254 and the pin 266 locks the C.B. truck 150 to the shuttle 256 as an example described above.

The worm drive mechanism 290 is operatively connected to the first sprocket 260 and includes the worm shaft 292 and nut 294 configured to engage an operator racking tool for rotating the worm shaft, the sprocket 260 and drive chain 254 and racking in and racking out the C.B. truck 150. The gear reducer 296 is connected between the worm drive mechanism 290 and first sprocket 260. The C.B. truck 150 includes the front and rear rollers 232a, 232b. In this example, the C.B. truck 150 has a width about the interior width of the switchgear frame 124 defined by the side rails 230 on which the front and rear rollers 232a, 232b of the C.B. truck 150 linearly moves. The shutter mechanism 310 is different than many conventional shutters since it is not operated by the circuit breaker.

Figure 18:
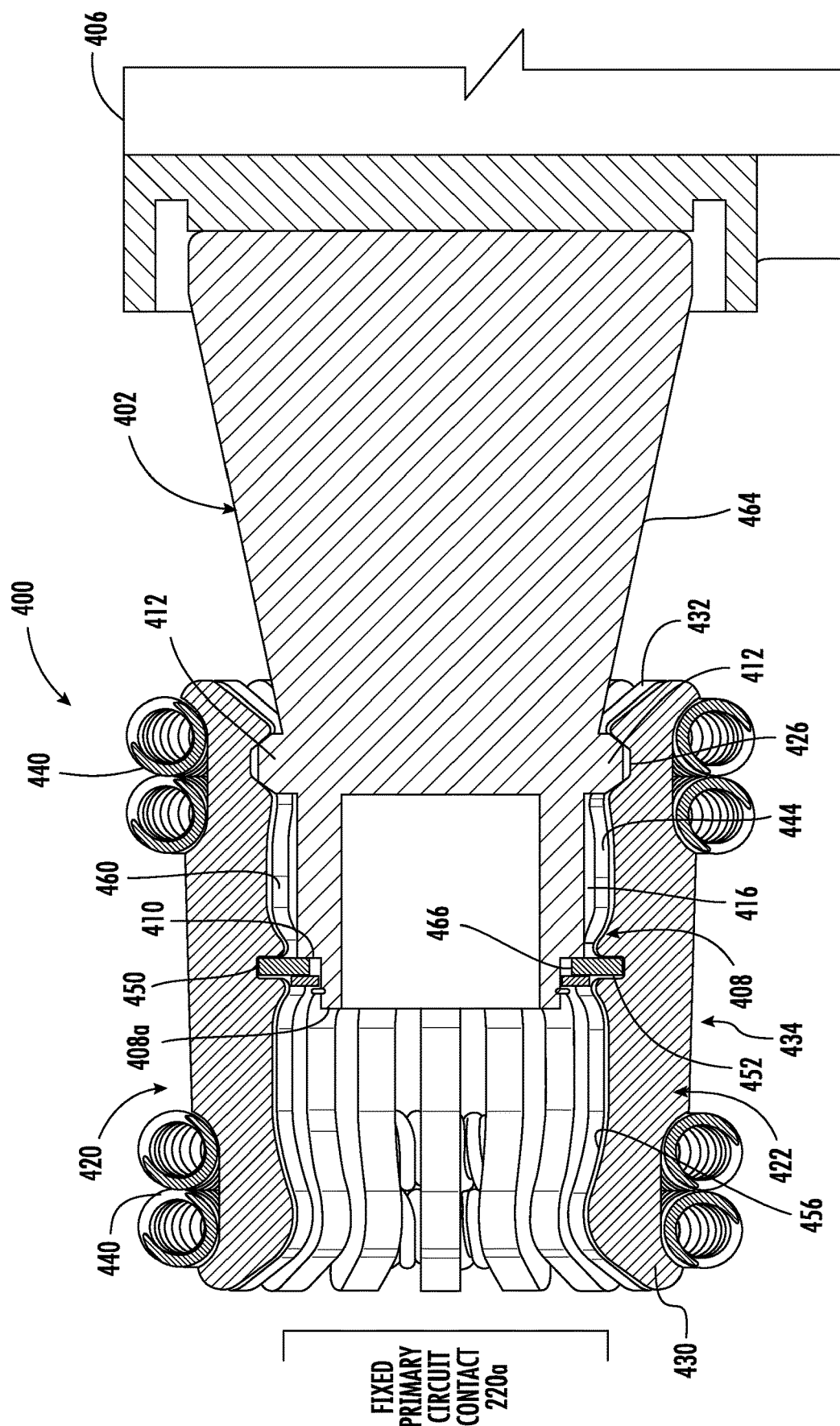
FIG. 18 is a partial schematic isometric and sectional view of a contact arm assembly, such as may be used for the switchgear circuit breaker as shown in FIG. 16.

Referring now to FIG. 18, there is illustrated a contact arm assembly 400 that may be used for the switchgear circuit breaker 250 such as illustrated in FIGS. 15 and 16. This contact arm assembly 400 includes a contact arm 402 having a central axis and may be formed as a hollow tube to aid in cooling.

The contact arm 402 includes a first end 406 configured for electrical connection with a pole of a circuit breaker, such as a vacuum interrupter, and a second end 408 having a distal end 408a defining a shoulder 410 and an engagement 412 that protrudes from the contact arm 402 proximal to the shoulder 410. The second end 408 of the contact arm 402 between the engagement 412 and shoulder 410 defines a tubular extension 416 of substantially one outer diameter and substantially one inner diameter as shown in FIG. 18.

A plurality of contact fingers 420 are mounted circumferentially on the second end 408 of the contact arm 402 and configured to electrically engage a primary circuit contact 220a. Each contact finger 420 may include a body 422 having a depression that could be formed as groove or socket as a receiver 426 that receives the engagement 412 for electrical contact.

The body 422 of each contact finger 420 includes first and second ends 430,432 and an outer edge 434 configured to receive coil springs 440 at each of the first and second ends. An inner edge 444 has the depression as for example a groove or socket as the receiver 426 formed therein at the second end 432. An annular ring 450 is received onto the shoulder 410 of the contact arm 402 and includes an outer circumferential edge that extends outward beyond the shoulder.

The medial portion of the inner edge 444 of the contact finger 420 includes a slot 452 that receives the outer circumferential edge of the annular ring 450 and forms a pivot point allowing the first end 430 of each contact finger 420 to bias when a primary circuit contact 220a electrically engages the contact fingers 420. The inner edge 444 of each contact finger 420 includes a first inward curved section 456 extending between the slot 452 and first end 430 and a second inward curved section 460 extending between the slot 452 and second end 432.

In an example, the engagement 412 may be formed as a plurality of balls extending from the outer surface of the contact arm 402 and each configured to be received within the depression as a groove or socket or other receiver 426 of a respective contact finger to which it engages. The depression as a groove or socket as a receiver 426 may be generally trapezoidal shaped and each ball may be generally trapezoidal shaped as illustrated and configured for frictional engagement with the trapezoidal shaped depression. In yet another example, the engagement 412 may be formed as a circumferential ridge.

Each contact finger 420 may be formed as a medial straight edge segment on the outer edge 434 extending between first and second ends 430,432. The contact arm 402 may be formed as a shaft having an outer taper 464 extending from the engagement 412 away from the contact fingers 420. The contact arm 402 may be formed as a tube at the end proximal to the circuit breaker pole to provide cooling and heat dissipation.

In operation, when the C.B. truck 150 carrying the circuit breaker is racked in, the fixed primary circuit contact 220a may engage the first ends 430 of the plurality of contact fingers 420 that circumferentially surround the second end 408 of the contact arm 402. As illustrated, that first end 430 of each contact finger 420 may be generally formed as an inward curved edge at that first end to permit the fixed primary circuit contact 220a to slide forward against each of the contact fingers and spread the contact fingers outward against the biasing force exerted by the springs 440.

In this example, the annular ring 456 is received onto the shoulder 410 of the contact arm 402, and the outer circumferential edge extends beyond the shoulder and engages the slot 452 at the medial portion of the inner edge of each contact finger and leaves some gap between the inner peripheral edge and the smaller outer surface at the distal end defined by the second end 408 of the contact arm 402. This allows some "play" and aids the pivoting motion of the contact fingers 420 when the first ends 430 of the contact fingers engage the fixed primary circuit contact 220a. A separate lock ring 466 may be positioned on the distal end 408a of the contact arm 402 at the shoulder 410 and aid in retaining the annular ring 450 onto the distal end and the shoulder.

Referring now to FIGS. 1 and 19-26, there is best illustrated how the electrical switchgear system 100 includes an improved convective ventilation system. As shown in FIG. 1, the front switchgear section 102 includes first and second sets of front and upper and lower switchgear housings 104, 106, 108, 110 having sidewalls and joined together, and a rear switchgear section 114, including first and second sets of rear upper and lower switchgear housings 116, 118, 120, 122 having sidewalls and joined together and connected to the rear walls of the respective front upper and lower switchgear housings.

The sidewalls of first and second sets of front and rear upper and lower switchgear housings include the stepped offset section 130 as best shown in the switchgear housing examples of FIGS. 2A, 2B and 3. When joined together, the stepped offset sections 130 form a ventilation duct 134 extending the height of the external switchgear system 100 defined by the various switchgear housings.

Figure 19:
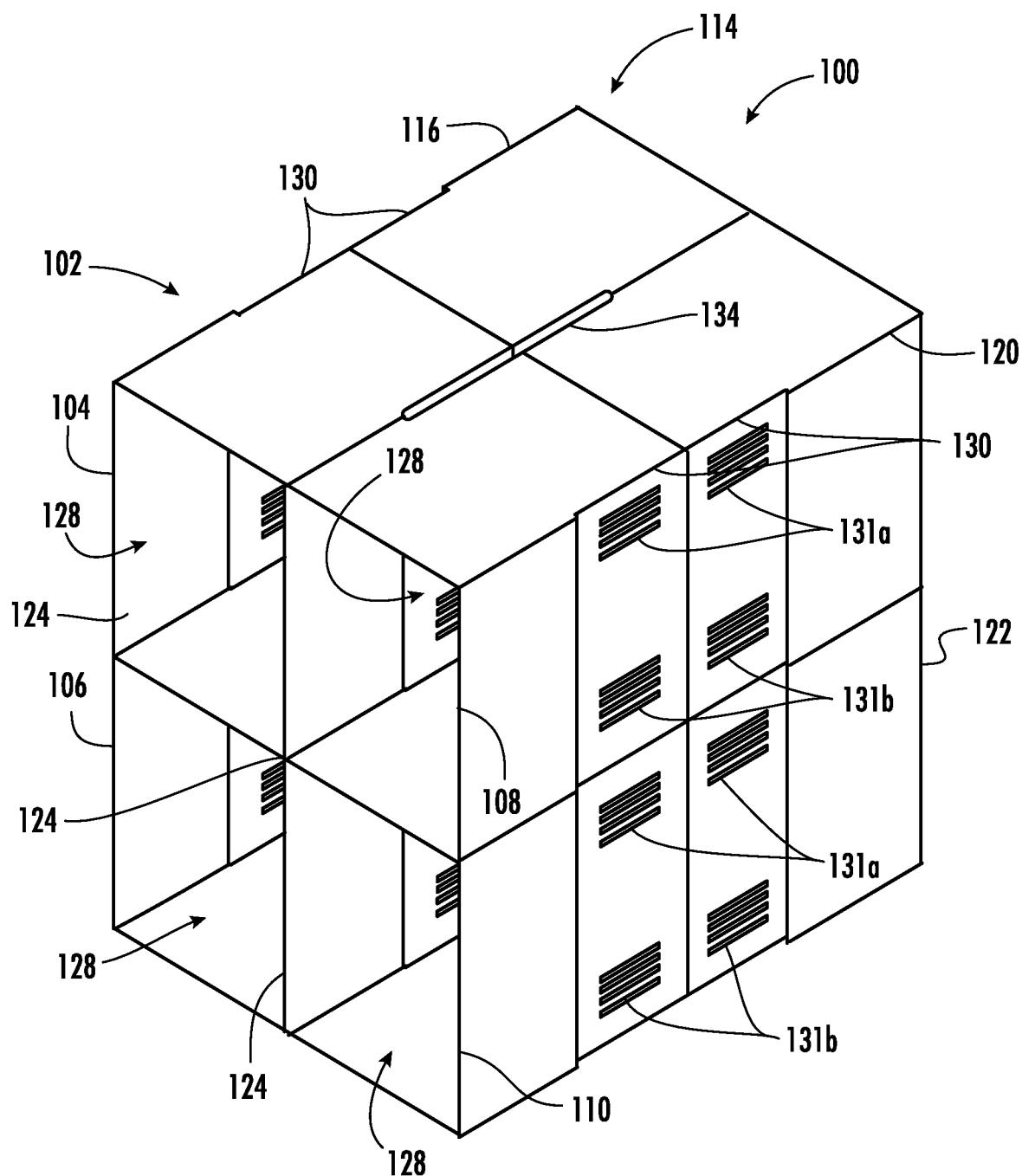
FIG. 19 is a schematic isometric view of the electrical switchgear system of FIG. 1 showing front and rear switchgear sections and the central ventilation duct that may be incorporated within the electrical switchgear system.
Figure 20:
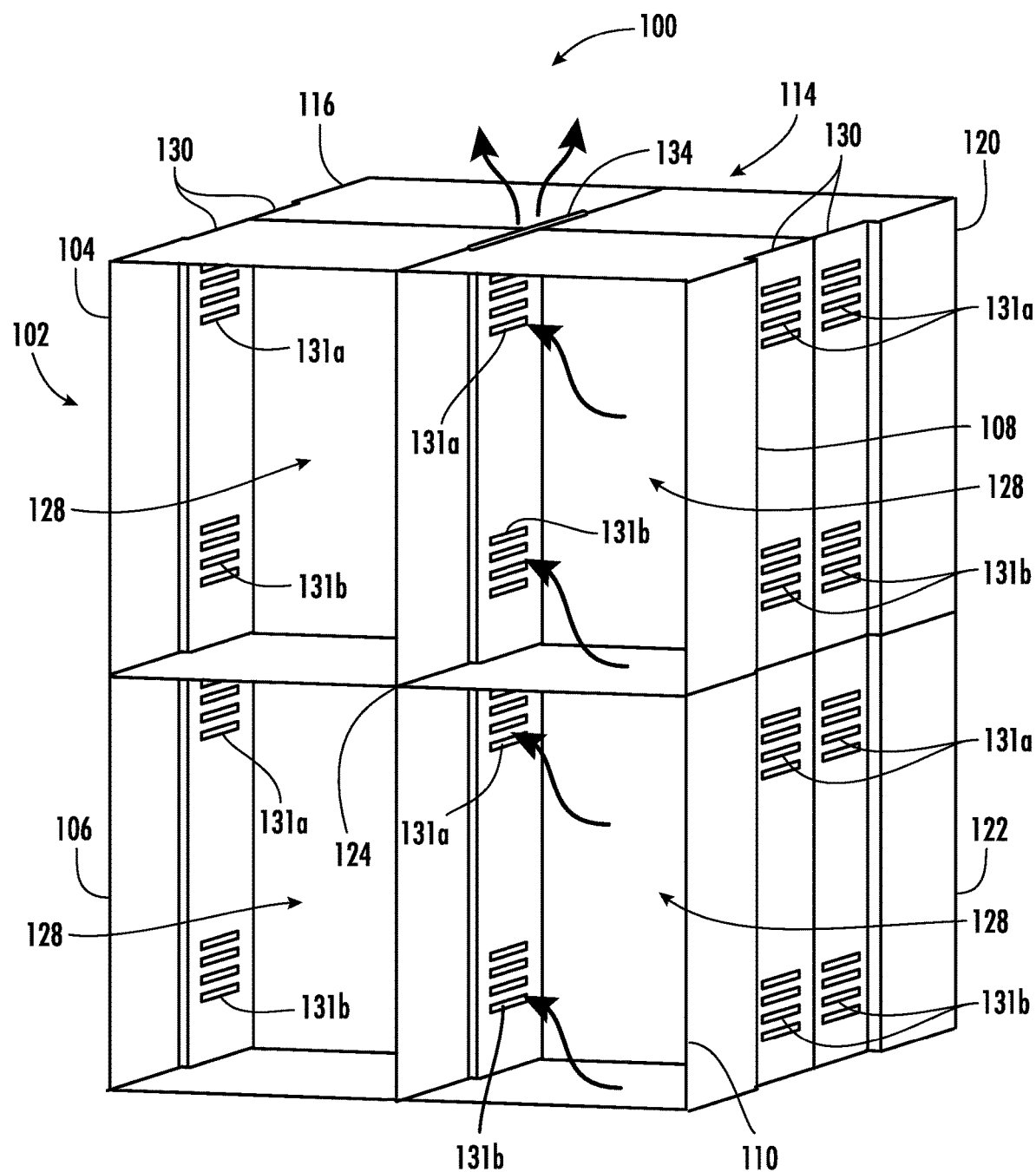
FIG. 20 is another schematic, isometric view of the switchgear system shown in FIG. 19 and showing by arrows the convective flow of air and gases out of the interior compartments and through the central ventilation duct.

Referring to the schematic, isometric views of FIGS. 19 and 20, upper and lower vents 131a, 131b are formed in the stepped offset sections 130 of the first and second sets of switchgear housings 102, 114 to vent the interior compartment 128 of the switchgear housings into the ventilation duct 134 as shown by the air and gas flow diagram in FIG. 20, where the air and gas flow is illustrated by the arrows, which aids in ventilation when excess heat is generated by switchgear components, and also aid in ventilation of the hot gases when arcing occurs such as with a short circuit.

Figure 21:
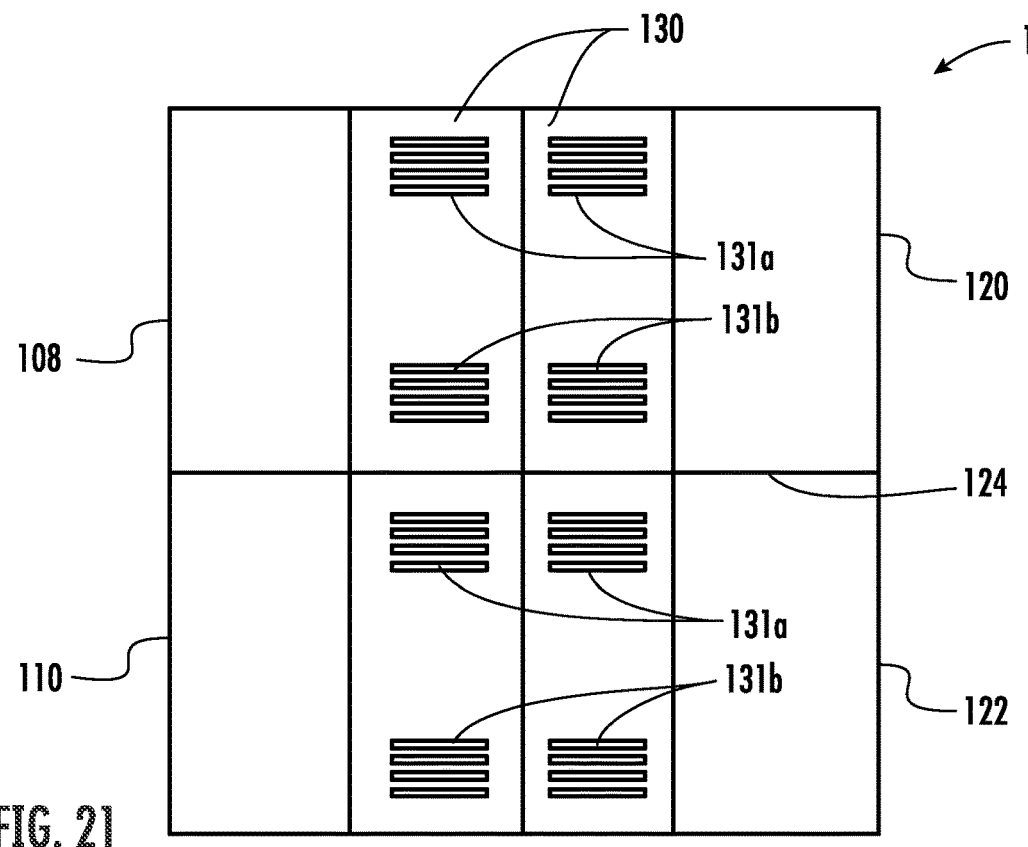
FIG. 21 is a side elevation view of the switchgear system of FIG. 19.
Figure 22:
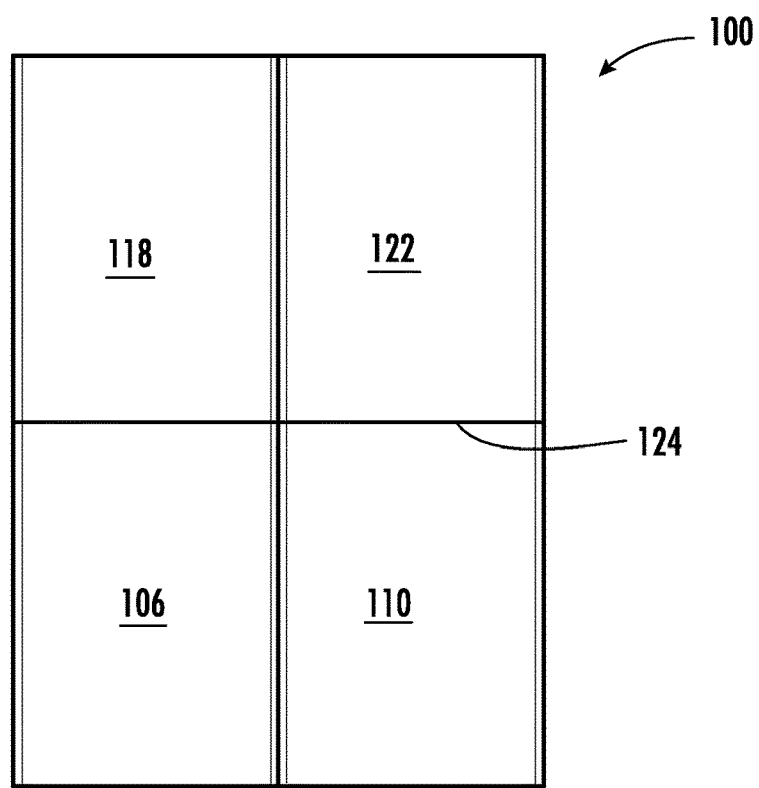
FIG. 22 is a bottom plan view of the switchgear system of FIG. 19.

In an example, the upper and lower vents 131a, 131b, which are contained within the ventilation duct 134, are formed in each stepped offset section 130. "N" sets of both front and rear upper and lower switchgear housings 102, 114 may be incorporated together, resulting in a wide switchgear system 100 having three, four or more switchgear housings placed adjacent in side-by-side relation to each other. Because each switchgear housing includes the stepped offset section 130 and upper and lower vents 131a, 131b, the outer sidewalls of the switchgear system 100 will have exposed stepped offset sections as best shown in FIGS. 19, 20 and 21, and thus, include vents 131a, 131b exposed to the outside of the switchgear system.

Figure 23:
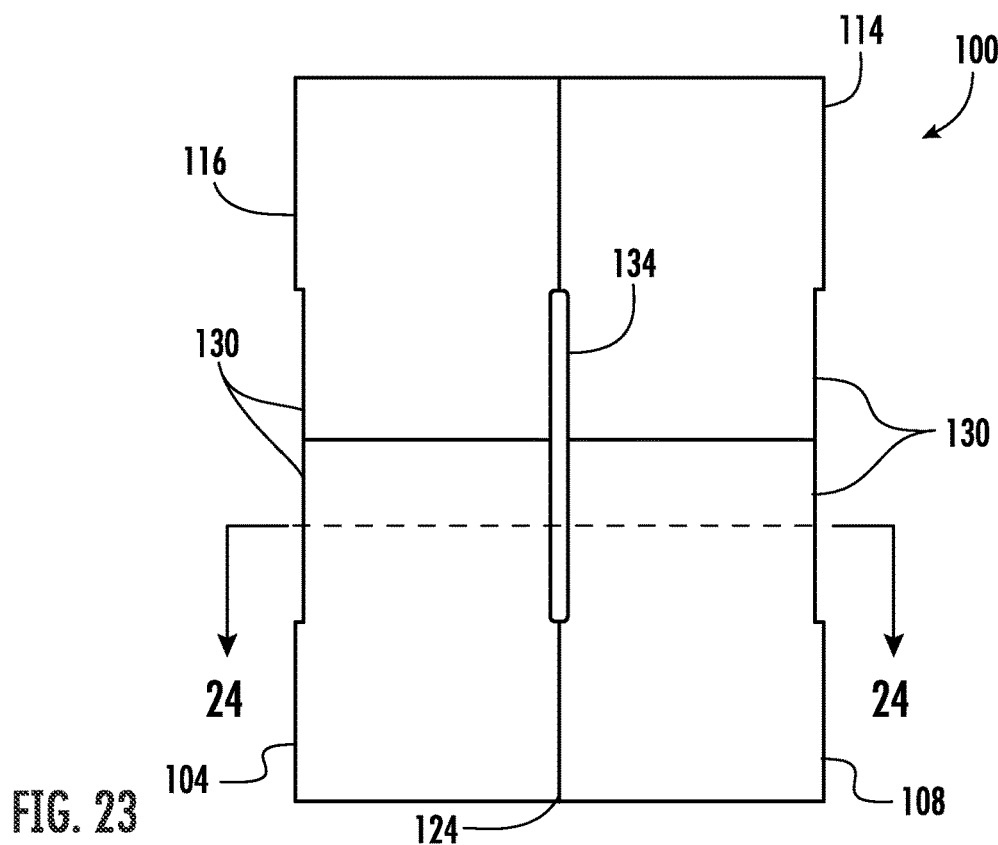
FIG. 23 is a top plan view of the switchgear system of FIG. 19 showing the central ventilation duct.
Figure 24:
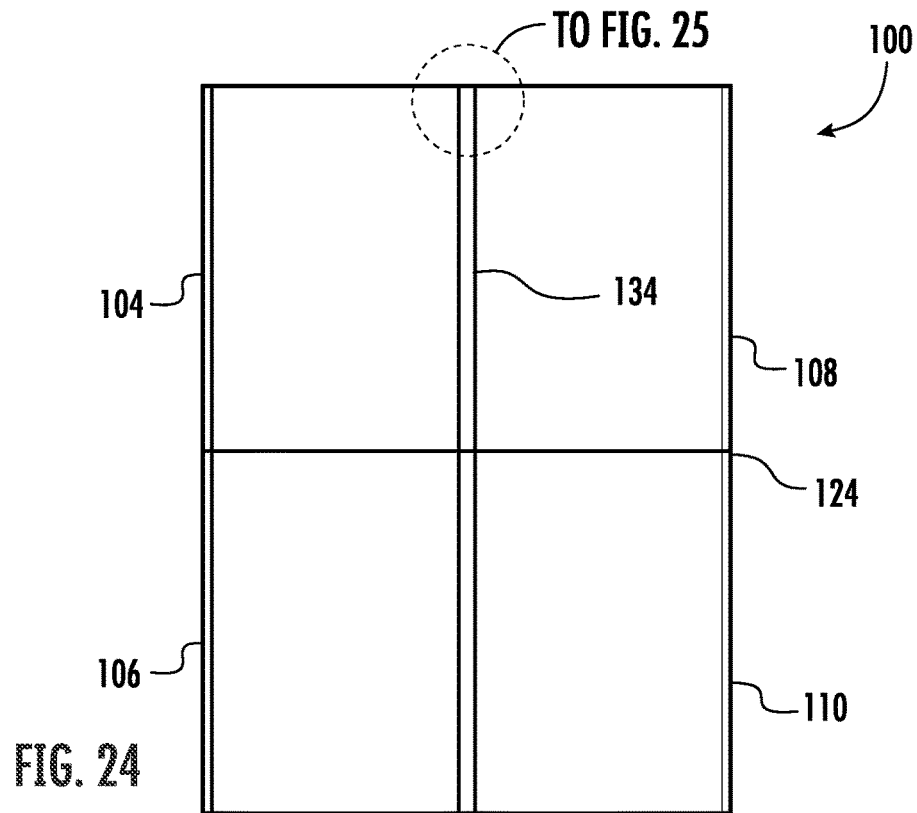
FIG. 24 is a sectional view taken along line 24-24 of FIG. 23 showing the central ventilation duct.
Figure 25:
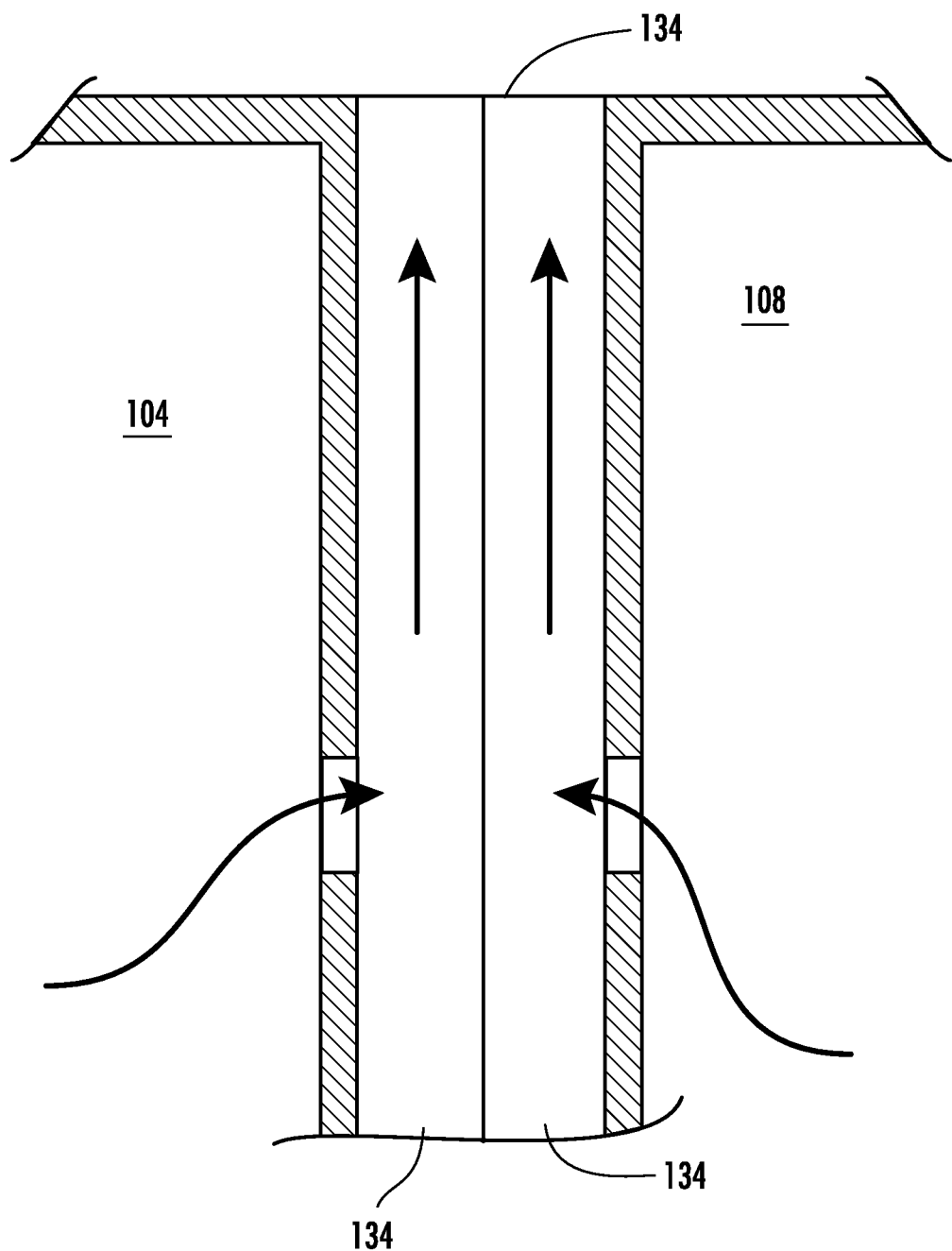
FIG. 25 is an enlarged view of the circled section of FIG. 24 showing the air and gas venting into the central ventilation duct.

The top plan view of FIG. 23 shows how the ventilation duct 134 is positioned and allows air and gas to vent as shown in the enlarged sectional views of FIG. 25 taken from FIG. 24, showing the vertical channel formed by the ventilation duct. A vent cover 132 may be positioned over the vents 131a, 131b in the ventilation duct 134 and direct the hot air from inside the switchgear housings to pass by convection out the ventilation duct 134 as shown in the schematic, sectional view of FIG. 26 taken along line 26-26 of FIG. 1 to illustrate the ventilation duct and the vent covers. The vent covers 132 may be formed as L-shaped brackets as shown in the central portion of the sectional view of FIG. 26 and help direct the hot air.

In an example, the switchgear housings 104-122 may include different electrical components as explained above and may include the truck 144 or C.B. truck 150 carrying components such as a circuit breaker or transformers. The front and rear switchgear sections 102, 114 may include "n" sets of both front and rear upper and lower switchgear housings having joined sidewalls, and stepped offset sections 130 to form a plurality of ventilation ducts 134. At least one of front and rear switchgear sections 102, 114 shown in FIG. 1 may include bus, cable and other compartments.

Figure 27:
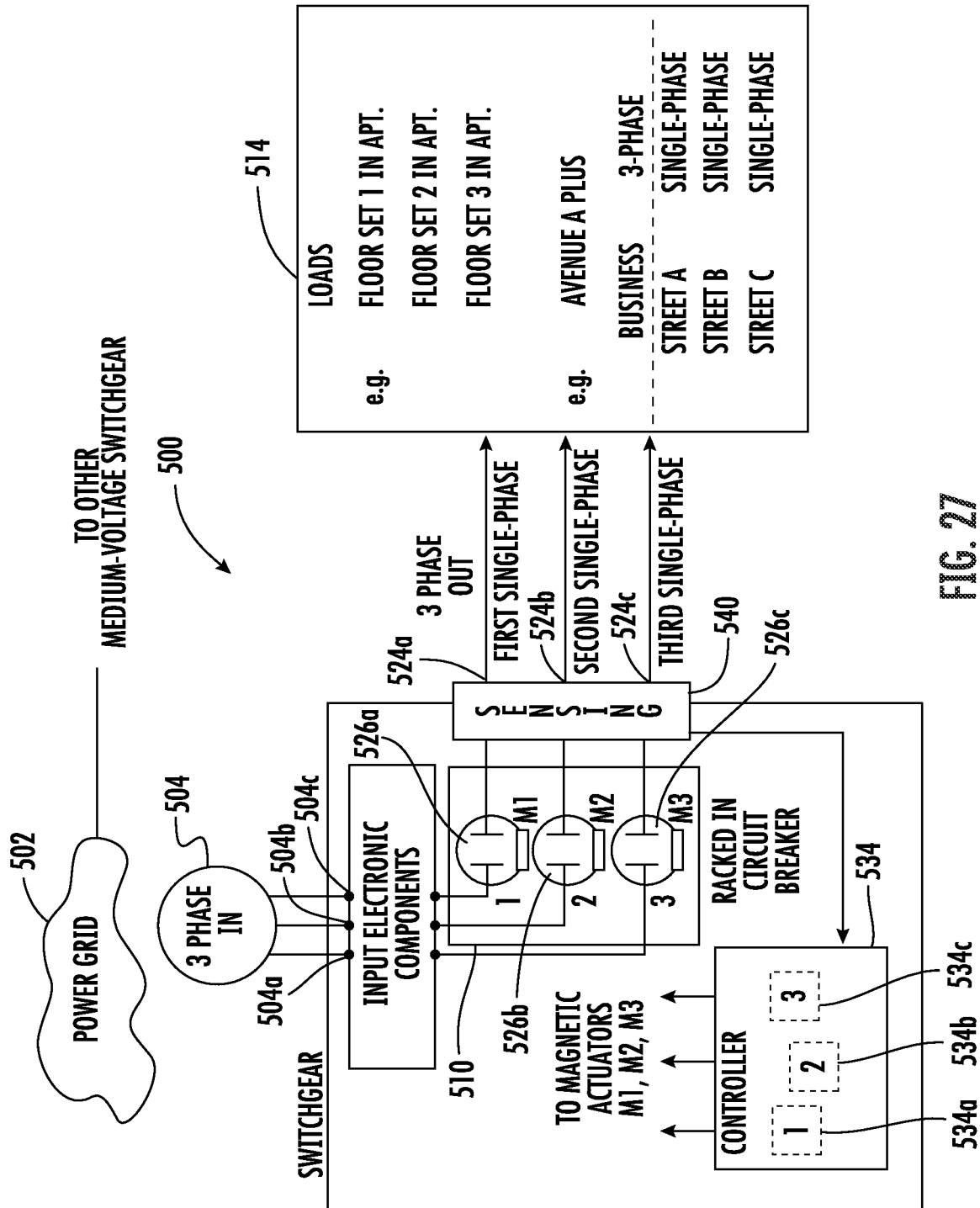
FIG. 27 is a block diagram of a three-phase power distribution grid incorporating a medium-voltage switchgear system having single-phase breaker control.

Referring now to FIG. 27, there is illustrated a schematic diagram of a medium-voltage switchgear system 500 incorporated within a three-phase power distribution grid 502 that includes a three-phase input 504 having first, second and third single-phase input circuits 504a, 504b, 504c. The switchgear system 500 includes single phase breaker control that allows the switchgear system to provide single phase control at the three-phase switchgear circuit breaker 510 such that a single phase line may power a neighborhood or a part of a residential tower when a single-phase line may go down.

Other neighborhoods or street sections as schematically illustrated by the block indicated as loads 514 for the loads, and may include floor areas of the skyscraper supplied by the other two single-phases and may have power. For example, the top apartments in a residential tower may have a short circuit in that single-phase segment and that single-phase may be tripped at the single-phase pole, e.g., a vacuum interrupter for that phase, but the bottom sections of the residential tower may have power provided from the other two single phase circuits and still maintain power.

The switchgear system 500 may include the components as described before such as the switchgear frame having an interior compartment and first, second and third single-phase inputs 504a, 504b, 504c and first, second and third single-phase outputs 524a, 524b, 524c connected to the respective first, second and third single-phase circuits of the three-phase power distribution grid 502. Primary and secondary circuits as described before may be included and a C.B. truck 150 and the three-phase circuit breaker 510 may be carried thereon and supported for linear movement on side rails provided on the switchgear frame such as described above.

As illustrated in FIG. 27, the three-phase circuit breaker 250 includes first, second and third single-phase vacuum interrupters 526a, 526b, 526c configured to be connected between the respective first, second and third single-phase inputs 504a, 504b, 504c and first, second and third single-phase outputs 524a, 524b, 524c. A first magnetic actuator M1 is connected to the first single-phase vacuum interrupter 526a. A second magnetic actuator M2 is connected to the second single-phase vacuum interrupter 526b. A third magnetic actuator M3 is connected to a third single-phase vacuum interrupter 526c. Each magnetic actuator M1, M2, M3 is configured to receive an interrupt signal and in response, actuate the respective vacuum interrupter 526a, 526b, 526c connected thereto into an open circuit condition.

A controller circuit 534 is connected to each of the first, second and third magnetic actuators M1, M2, M3 and configured to generate the interrupt signal to a respective magnetic actuator in response to a detected single-phase overcurrent or fault on a single-phase circuit as part of the load 514 and interrupt that single-phase circuit on which the single-phase overcurrent or fault occurred and maintain power on the remaining two single-phase circuits over which a single-phase overcurrent or fault is not detected.

The controller circuit 534 may be formed as a first controller 534a mounted within the interior compartment and connected to the first magnetic actuator M1. A second controller 534b may be mounted within the interior compartment and connected to the second magnetic actuator M2. A third controller 534c may be mounted within the interior compartment and connected to the third magnetic actuator M3. In another example, the controller circuit 534 may be formed as a single controller module mounted within the interior compartment and connected to each of the first, second and third magnetic actuators M1, M2, M3.

The loads 514 may include first, second and third single-phase loads and are connected to respective first, single and third single-phase outputs 524a, 524b, 524c, such as the plurality of floors in an apartment building having an electrical demand operating with single-phase, e.g., the top floors are powered by a single-phase line, the mid-floors are powered by the second single-phase line, and the bottom floors are powered by the third single-phase line. In another example, the first, second and third loads may be a business that uses three-phase power and a group of homes that use a single-phase power.

A sensing circuit 540 may be connected to the first, second and third single-phase outputs 524a, 524b, 524c and configured to detect a single-phase overcurrent or fault in the first, second and third single-phase circuits. The controller circuit 534 may receive data from the sensing circuit 540 and may generate an interrupt signal to a respective magnetic actuator M1, M2, M3 to actuate and move the movable contact of the vacuum interrupter away from its fixed contact and open the circuit. The sensing circuit 540 may be formed as a current or potential transformer or other similar sensing devices.

As described before, the switchgear system 500 may include a switchgear housing and frame 124 having a C.B. drive mechanism 152 mounted on the switchgear frame and connected to the C.B. truck 150 and configured to rack the truck and circuit breaker carried thereon into a first connected position where the primary and secondary circuits are electrically connected, rack out the truck into a second test position where a primary circuit is electrically disconnected and a secondary circuit connected, and rack out into a third disconnected position where the primary and secondary circuits are electrically disconnected. The controller circuit 534 may be formed as a microcontroller or other processor and may be part of the circuit breaker and connected to each of the first, second and third magnetic actuators M1, M2, M3.

Many modifications and other embodiments of the invention will come to the mind of one skilled in the art having the benefit of the teachings presented in the foregoing descriptions and the associated drawings. Therefore, it is That which is claimed is:

1. A switchgear system, comprising:
a switchgear frame including an interior compartment and primary circuit contacts;
a drive mechanism mounted on the switchgear frame;
a truck carrying a circuit breaker and supported for linear movement on the switchgear frame, the truck separate from and movably connected to the drive mechanism, the drive mechanism configured to rack in the truck where the circuit breaker is in electrical connection with the primary circuit contacts, and rack out the truck where the circuit breaker is electrically disconnected from the primary circuit contacts; and
a shutter mechanism operatively connected to said drive mechanism, the shutter mechanism comprising a shutter and a shutter linkage connected to said drive mechanism and the shutter, wherein as the drive mechanism racks in the circuit breaker, the shutter linkage moves the shutter opened, and as the drive mechanism racks out the circuit breaker, the shutter linkage moves the shutter closed over the primary circuit contacts,
wherein the driving mechanism moves the shutter mechanism while the driving mechanism simultaneously moves the truck.

2. The switchgear system of claim 1 wherein said primary circuit contacts comprise upper and lower primary circuit contacts and the shutter comprising upper and lower shutters.

3. The switchgear system of claim 1 wherein said primary circuit contacts comprise a contact body and the shutter is pivotally mounted on the contact body.

4. The switchgear system of claim 1 wherein said shutter linkage comprises a cam connected to said drive mechanism, and a cam follower linkage arm operatively connected to said shutter and configured to open and close said shutter based upon a rotation of said cam.

5. The switchgear system of claim 4 wherein said drive mechanism comprises a drive chain connected to the truck and configured to rack in and rack out the truck and the circuit breaker, and first and second sprockets interconnecting the drive chain, and a support rod axially supported by said second sprocket on which said cam is mounted to rotate.

6. The switchgear system of claim 5 wherein said drive mechanism further comprises a shuttle carried by the drive chain and a pin that locks the truck to the shuttle.

7. The switchgear system of claim 5 wherein said drive mechanism further comprises a worm drive operatively connected to the first sprocket and having a worm shaft configured to engage a racking tool for rotating the worm shaft, the first sprocket and the drive chain and racking in and racking out the truck.

8. The switchgear system of claim 7 wherein said drive mechanism further comprises a gear reducer connected between said worm drive and the first sprocket.

9. The switchgear system of claim 1 wherein said truck comprises a plurality of front rollers and a plurality of rear rollers that support the truck for translational rolling movement along the switchgear frame.

10. The switchgear system of claim 9 wherein said switchgear frame further includes rails on which the front and rear rollers are supported, said rails having a channel stop configured to chock the rear rollers when the circuit breaker is in electrical connection with the primary circuit contacts.

11. The switchgear system of claim 1 wherein said circuit breaker includes three-phase vacuum switches.

12. The switchgear system of claim 1 further comprising a spring engaging the switchgear frame and the truck, the spring biasing the truck and the circuit breaker into the primary circuit contacts.

13. A switchgear system, comprising:
a switchgear frame including an interior compartment and primary circuit contacts comprising at least one contact body;
a drive mechanism mounted on the switchgear frame;
a truck carrying a circuit breaker and supported for linear movement on the switchgear frame, the truck separate from and movably connected to the drive mechanism, the drive mechanism configured to rack in the truck where the circuit breaker is in electrical connection with the primary circuit contacts, and rack out the truck where the circuit breaker is electrically disconnected from the primary circuit contacts; and
a shutter mechanism operatively connected to said drive mechanism, the shutter mechanism comprising a shutter pivotally mounted on the contact body and a shutter linkage connected to said drive mechanism and the shutter, wherein as the drive mechanism racks in the circuit breaker the shutter linkage moves the shutter opened, and as the drive mechanism racks out the circuit breaker, the shutter linkage moves the shutter closed over the primary circuit contacts, wherein said shutter linkage comprises a cam connected to said drive mechanism and a cam follower linkage arm operatively connected to said shutter and configured to open and close said shutter based upon a rotation of said cam, wherein said drive mechanism comprises a drive chain connected to the truck and configured to rack in and rack out the truck and the circuit breaker, and first and second sprockets interconnecting the drive chain, and a support rod axially connected to said second sprocket on which said cam is mounted to rotate said cam and open and close said shutter,
wherein the driving mechanism moves the shutter mechanism while the driving mechanism simultaneously moves the truck.

14. The switchgear system of claim 13 wherein said primary circuit contacts comprise upper and lower primary circuit contacts and the shutter comprising upper and lower shutters.

15. The switchgear system of claim 13 further comprising a shuttle carried by the drive chain and a pin that locks the truck to the shuttle.

16. The switchgear system of claim 13 wherein said drive mechanism further comprises a worm drive operatively connected to the first sprocket and having a worm shaft configured to engage a racking tool for rotating the worm shaft, the first sprocket and the drive chain and racking in and racking out the truck.

17. The switchgear system of claim 16 wherein said drive mechanism further comprises a gear reducer connected between said worm drive and the first sprocket.

18. The switchgear system of claim 13 wherein said truck comprises a plurality of front rollers and a plurality of rear rollers that support the truck for translational rolling movement along the switchgear frame.

19. The switchgear system of claim 18 wherein said switchgear frame further includes rails on which the front and rear rollers are supported, said rails having a channel stop configured to chock the rear rollers when the circuit breaker is in electrical connection with the primary circuit contacts.

20. The switchgear system of claim 13 wherein said circuit breaker comprises three-phase vacuum switches.

21. The switchgear system of claim 13 further comprising a spring engaging the switchgear frame and the truck, the spring biasing the truck and the circuit breaker into the primary circuit contacts.

22. A method for operating a switchgear system having a switchgear frame, the switchgear frame including an interior compartment and primary circuit contacts, the method comprising:

operating a drive mechanism mounted on the switchgear frame;

supporting a truck carrying a circuit breaker for linear movement on the switchgear frame, the truck separate from and movably connected to the drive mechanism, the drive mechanism racking in the truck where the circuit breaker is in electrical connection with the primary circuit contacts and racking out the truck where the circuit breaker is electrically disconnected from the primary circuit contacts; and operating a shutter mechanism operatively connected to said drive mechanism, the shutter mechanism comprising a primary contact shutter and a shutter linkage interconnected to said drive mechanism and the primary contact shutter, wherein as the drive mechanism racks in the circuit breaker, the shutter linkage moves the primary contact shutter opened and as the drive mechanism racks out the circuit breaker, the shutter linkage moves the primary contact shutter closed over the primary circuit contacts, wherein the driving mechanism moves the shutter mechanism while the driving mechanism simultaneously moves the truck.

23. The method of claim 22 wherein the primary circuit contacts comprise upper and lower primary circuit contacts and the primary contact shutter comprising upper and lower shutters.

24. The method of claim 22 wherein the primary circuit contacts comprise a contact body and the primary contact shutter is pivotally mounted on the contact body.

25. The method of claim 22 wherein the shutter linkage comprises a cam connected to the drive mechanism and a cam follower linkage arm operatively connected to the primary contact shutter and configured to open and close the primary contact shutter based upon rotation of said cam.

26. The method of claim 22 wherein the drive mechanism comprises a drive chain connected to the truck and configured to rack in and rack out the truck and the circuit breaker, and first and second sprockets interconnecting the drive chain, and a support rod axially connected to said second sprocket on which said cam is mounted to rotate said cam and open and close said primary contact shutter.

27. The method of claim 22 wherein the truck comprises a plurality of front rollers and a plurality of rear rollers that support the truck for translational rolling movement along the switchgear frame.

28. The method of claim 27 wherein the switchgear frame further includes rails on which the front and rear rollers are supported, and the rails have a channel stop configured to chock the rear rollers when the circuit breaker is in electrical connection with the primary circuit contacts.

* * * * *